(12) United States Patent
Machida

(10) Patent No.: US 10,338,357 B2
(45) Date of Patent: Jul. 2, 2019

(54) VARIABLE-POWER OPTICAL SYSTEM, OPTICAL DEVICE, AND METHOD FOR MANUFACTURING VARIABLE-POWER OPTICAL SYSTEM

(71) Applicant: Nikon Corporation, Minato-ku, Tokyo (JP)

(72) Inventor: Kosuke Machida, Tokyo (JP)

(73) Assignee: Nikon Corporation, Tokyo (JP)

( * ) Notice: Subject to any disclaimer, the term of this patent is extended or adjusted under 35 U.S.C. 154(b) by 34 days.

(21) Appl. No.: 15/418,770

(22) Filed: Jan. 29, 2017

(65) Prior Publication Data

US 2017/0176725 A1 Jun. 22, 2017

Related U.S. Application Data

(63) Continuation of application No. PCT/JP2015/071580, filed on Jul. 30, 2015.

(30) Foreign Application Priority Data

| Jul. 30, 2014 | (JP) | ................................ | 2014-154837 |
| Jul. 30, 2014 | (JP) | ................................ | 2014-154838 |
| Jul. 30, 2014 | (JP) | ................................ | 2014-154839 |

(51) Int. Cl.
  *G02B 15/14* (2006.01)
  *G02B 13/18* (2006.01)
  (Continued)

(52) U.S. Cl.
  CPC .............. *G02B 15/14* (2013.01); *G02B 13/02* (2013.01); *G02B 13/18* (2013.01); *G02B 15/16* (2013.01);
  (Continued)

(58) Field of Classification Search
  CPC .............. G02B 27/646; G02B 27/0025; G02B 15/177; G02B 15/20; G02B 13/009;
  (Continued)

(56) References Cited

U.S. PATENT DOCUMENTS

| 5,000,549 A | 3/1991 | Yamazaki |
| 5,040,881 A | 8/1991 | Tsuji |
| (Continued) |

FOREIGN PATENT DOCUMENTS

| JP | 01-284824 A | 11/1989 |
| JP | 02-093620 A | 4/1990 |
| (Continued) |

OTHER PUBLICATIONS

Extended European Search Report dated Feb. 9, 2018, in European Patent Application No. EP15826523.1.
(Continued)

*Primary Examiner* — Evelyn A Lester
(74) *Attorney, Agent, or Firm* — Shapiro, Gabor and Rosenberger, PLLC

(57) ABSTRACT

Composing, in order from an object side along the optical axis, a first lens group having positive refractive power, and at least one lens group; upon varying magnification, an interval between the first lens group and a lens group at an image side of the first lens group and adjacent thereto being varied, said first lens group comprising a focusing lens group which is moved along the optical axis for focusing and a vibration reducing lens group that is movable to include a component in a direction perpendicular to the optical axis, thereby providing a an excellent optical performance upon focusing.

53 Claims, 14 Drawing Sheets

(51) Int. Cl.
| | | |
|---|---|---|
| *G02B 15/16* | (2006.01) | |
| *G02B 15/20* | (2006.01) | |
| *G02B 13/02* | (2006.01) | |
| *G02B 15/22* | (2006.01) | |
| *G02B 27/64* | (2006.01) | |
| *H04N 5/232* | (2006.01) | |
| *G02B 15/177* | (2006.01) | |
| *G02B 13/04* | (2006.01) | |
| *G02B 13/00* | (2006.01) | |
| *H04N 5/225* | (2006.01) | |
| *G02B 27/00* | (2006.01) | |
| *G02B 15/15* | (2006.01) | |
| *G02B 15/173* | (2006.01) | |
| *G02B 15/167* | (2006.01) | |
| *G02B 5/00* | (2006.01) | |

(52) U.S. Cl.
CPC ............ *G02B 15/20* (2013.01); *G02B 15/22* (2013.01); *G02B 27/646* (2013.01); *H04N 5/23212* (2013.01); *G02B 5/005* (2013.01); *G02B 13/009* (2013.01); *G02B 13/04* (2013.01); *G02B 15/15* (2013.01); *G02B 15/167* (2013.01); *G02B 15/173* (2013.01); *G02B 15/177* (2013.01); *G02B 27/0025* (2013.01); *H04N 5/225* (2013.01)

(58) Field of Classification Search
CPC ........ G02B 13/04; G02B 13/18; G02B 15/14; G02B 5/005; G02B 15/15; G02B 15/173; G02B 15/16; G02B 15/167; H04N 5/225
USPC ................ 359/557, 689, 716, 740, 753, 784
See application file for complete search history.

(56) References Cited

U.S. PATENT DOCUMENTS

| | | |
|---|---|---|
| 5,272,564 A | 12/1993 | Suzuki et al. |
| 5,442,486 A | 8/1995 | Sato |
| 5,687,026 A | 11/1997 | Sato |
| 6,493,142 B1 | 12/2002 | Itoh |
| 8,570,662 B2 * | 10/2013 | Eguchi ................. G02B 15/173 359/684 |
| 2003/0137748 A1 | 7/2003 | Mukaiya |
| 2009/0147376 A1 | 6/2009 | Take |
| 2010/0302640 A1 | 12/2010 | Take |
| 2012/0134031 A1 | 5/2012 | Eguchi et al. |
| 2013/0120640 A1 | 5/2013 | Taki |
| 2013/0271643 A1 | 10/2013 | Inomoto |
| 2013/0271849 A1 * | 10/2013 | Hori ....................... G02B 15/14 359/687 |
| 2015/0022901 A1 | 1/2015 | Komatsu et al. |

FOREIGN PATENT DOCUMENTS

| | | |
|---|---|---|
| JP | 05-303035 A | 11/1993 |
| JP | 08-334692 A | 12/1996 |
| JP | 2001-042214 A | 2/2001 |
| JP | 2003-262780 A | 9/2003 |
| JP | 2004-151619 A | 5/2004 |
| JP | 2005-134548 A | 5/2005 |
| JP | 2009-133941 A | 6/2009 |
| JP | 2010-276744 A | 12/2010 |
| JP | 2012-093548 A | 5/2012 |
| JP | 2012-113139 A | 6/2012 |
| JP | 2013-109013 A | 6/2013 |
| WO | WO 2013/153793 A1 | 10/2013 |

OTHER PUBLICATIONS

English Translation of International Preliminary Report on Patentability from International Patent Application No. PCT/JP2015/071580, dated Feb. 9, 2017.

Office Action dated Dec. 18, 2018, in Japanese Patent Application No. 2016-538415.

Examination report dated Mar. 6, 2019, in European Patent Application No. 15826523.1.

* cited by examiner

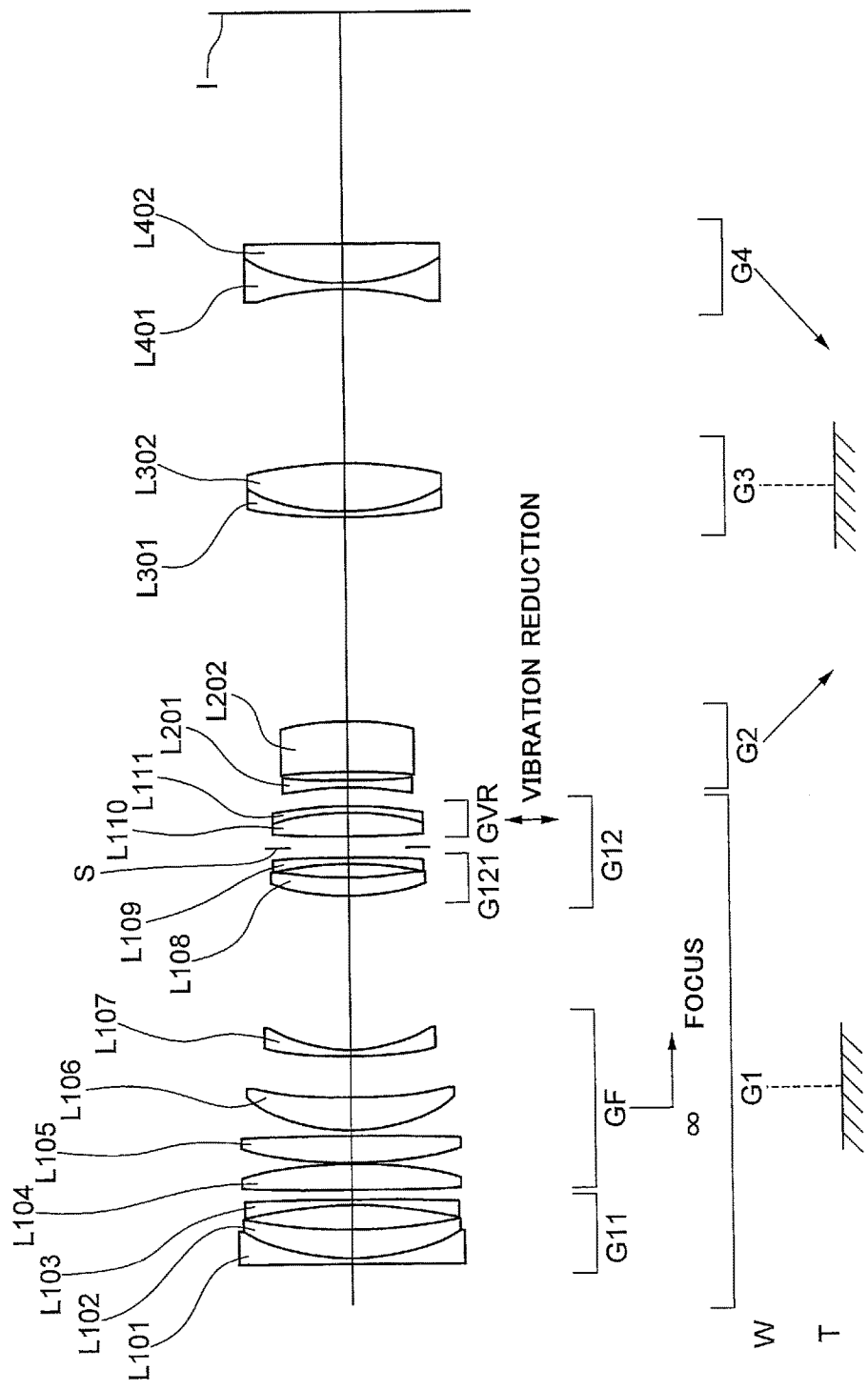

VARIABLE-POWER OPTICAL SYSTEM, OPTICAL DEVICE, AND METHOD FOR MANUFACTURING VARIABLE-POWER OPTICAL SYSTEM

TECHNICAL FIELD

The present invention relates to a variable magnification optical system that is suitable to be used for a photographic camera, an electronic still camera, a video camera and the like, an optical device equipped with the variable magnification optical system, and a method for manufacturing the variable magnification optical system.

BACKGROUND ART

There have been proposed a variable magnification optical system suitable for the photographic camera, the electronic still camera, the video camera or the like. See, for example, Japanese Patent application Laid-Open No. 2013-109013. However, in a conventional variable magnification optical system, there has been a problem that an optical performance upon focusing is not sufficient.

PRIOR ART REFERENCE

Patent Document

Patent Document 1: Japanese Patent application Laid-Open Gazette No. 2013-109013

SUMMARY OF THE INVENTION

According to a first aspect of the present application, there is provided a variable magnification optical system comprising, in order from an object side along the optical axis, a first lens group having positive refractive power, and at least one lens group, upon varying magnification, an interval between the first lens group and a lens group at an image side of and adjacent to the first lens group being varied, said first lens group comprising a focusing lens group which is moved along the optical axis for focusing and a vibration reducing lens group that is movable to include a component in a direction perpendicular to the optical axis.

According to a second aspect of the present application, there is provided a variable magnification optical system comprising, in order from an object side along the optical axis, a first lens group having positive refractive power, a second lens group having negative refractive power, a third lens group having positive refractive power and at least one lens group; upon varying magnification, an interval between the first lens group and the second lens group being varied, an interval between the second lens group and the third lens group being varied and an interval between the third lens group and a lens group at an image side of and adjacent to the third lens group being varied; and said first lens group comprising a focusing lens group which is moved along the optical axis for focusing; said variable magnification optical system further comprising a vibration reducing lens group that is movable to include a component in a direction perpendicular to the optical axis; and the following conditional expression being satisfied:

$$0.2 < f1/(-f2) < 2.00$$

where f1 denotes a focal length of the first lens group, and f2 denotes a focal length of the second lens group.

According to a third aspect of the present application, there is provided a variable magnification optical system comprising, in order from an object side along the optical axis, a first lens group having positive refractive power, and at least one lens group; upon varying magnification, an interval between the first lens group and a lens group at an image side of and adjacent to the first lens group being varied; said first lens group comprising, in order from an object side, a front group having negative refractive power and a focusing lens group which is moved along the optical axis for focusing; and the following conditional expression being satisfied:

$$1.0 < f1/(-f11) < 2.5$$

where f1 denotes the focal length of the first lens group, and f11 denotes a focal length of said front group.

According to a fourth aspect of the present application, there is provided an optical apparatus equipped with the variable magnification optical system according to any one of said first to said third aspects of the present application.

Further, according to a fifth aspect of the present application, there is provided a method for manufacturing a variable magnification optical system comprising, in order from an object side along the optical axis, a first lens group having positive refractive power, and at least one lens group, the method comprising the steps of: constructing said first lens group to comprise a focusing lens group which is moved along the optical axis for focusing and a vibration reducing lens group that is movable to include a component in a direction perpendicular to the optical axis; and constructing such that, upon varying magnification, an interval between the first lens group and a lens group at an image side of and adjacent to the first lens group is varied.

Further, according to a sixth aspect of the present application, there is provided a method for manufacturing a variable magnification optical system comprising, in order from an object side along the optical axis, a first lens group having positive refractive power, a second lens group having negative refractive power, a third lens group having positive refractive power and at least one lens group, the method comprising the steps of:
constructing said first lens group to comprise a focusing lens group which is moved along the optical axis for focusing; constructing said variable magnification optical system to comprise further a vibration reducing lens group that is movable to include a component in a direction perpendicular to the optical axis,
constructing such that the following conditional expression being satisfied:

$$0.2 < f1/(-f2) < 2.00$$

where f1 denotes a focal length of the first lens group, and f2 denotes a focal length of the second lens group, and
constructing such that, upon varying magnification, an interval between the first lens group and the second lens group is varied, an interval between the second lens group and the third lens group is varied and an interval between the third lens group and a lens group at an image side of and adjacent to the third lens group is varied.

Further, according to a seventh aspect of the present application, there is provided a method for manufacturing a variable magnification optical system comprising, in order from an object side along the optical axis, a first lens group having positive refractive power, and at least one lens group,
the method comprising the steps of:
constructing such that said first lens group comprises, in order from an object side along the optical axis, a front group having negative refractive power and a focusing lens group which is moved along the optical axis for focusing;

constructing such that the following conditional expression is satisfied:

$$1.0 < f1/(-f11) < 2.5$$

where f1 denotes the focal length of the first lens group, and f11 denotes a focal length of said front group; and constructing such that, upon varying magnification, an interval between the first lens group and a lens group at an image side of and adjacent to the first lens group is varied.

BRIEF DESCRIPTION OF THE DRAWINGS

FIG. 1 is a sectional view showing a configuration of a variable magnification optical system according to a First Example that is common to a first to a third embodiments of the present application.

FIGS. 2A and 2B are graphs showing various aberrations in the wide-angle end state of the variable magnification optical system according to the First Example of the present application, in which FIG. 2A shows various aberrations in the wide-angle end state upon focusing on an infinite distance object, and FIG. 2B shows meridional transverse aberrations when correction of image blur is conducted for rotational camera shake of 0.30 degrees.

FIGS. 3A and 3B are graphs showing various aberrations in the telephoto end state of the variable magnification optical system according to the First Example, in which FIG. 3A shows various aberrations in the telephoto end state upon focusing on an infinite distance object, and FIG. 3B shows meridional transverse aberrations when correction of image blur is conducted for rotational camera shake of 0.20 degrees.

FIGS. 7A and 7B are graphs showing various aberrations in the wide-angle end state of the variable magnification optical system according to the Second Example, in which FIG. 7A shows various aberrations in the wide-angle end state upon focusing on an infinite distance object, and FIG. 7B shows meridional transverse aberrations when correction of image blur is conducted for rotational camera shake of 0.30 degrees.

FIGS. 8A and 8B are graphs showing various aberrations in the telephoto end state of the variable magnification optical system according to the Second Example, in which FIG. 8A shows various aberrations in the telephoto end state upon focusing on an infinite distance object, and FIG. 8B shows meridional transverse aberrations when correction of image blur is conducted for rotational camera shake of 0.20 degrees.

EMBODIMENTS FOR CARRYING OUT THE INVENTION

Figure 2A:
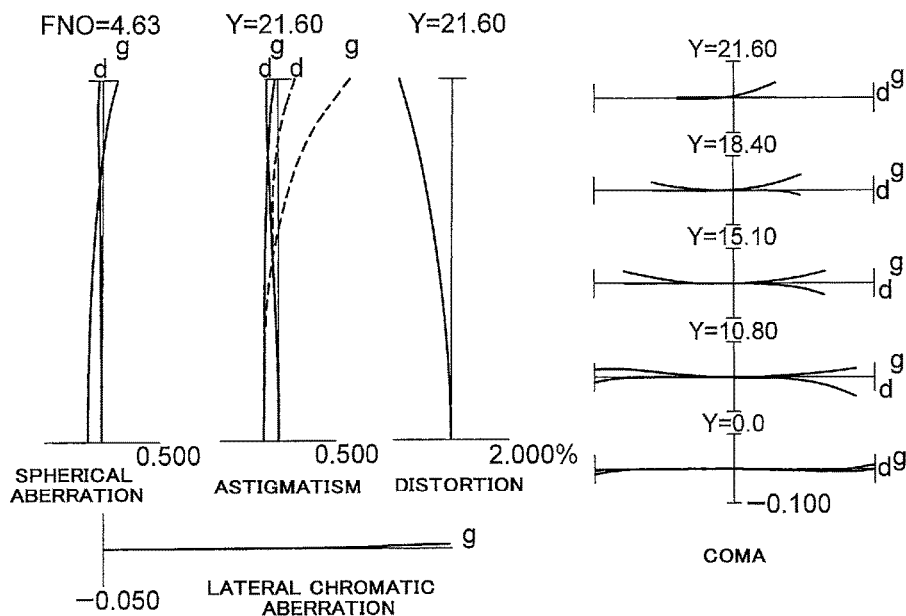

Hereinafter, a variable magnification optical system, an optical apparatus and a method for manufacturing the variable magnification optical system, according to the first embodiment of the present application are explained. At first, the variable magnification optical system according to the first embodiment of the present application is explained.

The variable magnification optical system according to the first embodiment of the present application comprises, in order from an object side along the optical axis: a first lens group having positive refractive power, and at least one lens group; upon varying magnification, an interval between the first lens group and a lens group at an image side of and adjacent to the first lens group being varied; and said first lens group comprising a focusing lens group which is moved along the optical axis for focusing and a vibration reducing lens group that is movable to include a component in a direction perpendicular to the optical axis.

As described above, in the variable magnification optical system according to the first embodiment of the present application, upon varying magnification, the interval between the first lens group and the lens group at an image side of and adjacent to the first lens group is varied. With this configuration, the variable magnification optical system according to the first embodiment of the present application can correct superbly various aberrations upon varying magnification. In particular, according to the variable magnification optical system according to the first embodiment of the present application, it is possible to secure a predetermined magnification ratio by changing the interval between the first lens group and the lens group at the image side of and adjacent to the first lens group.

In the variable magnification optical system according to the first embodiment of the present application, said first lens group comprises a focusing lens group which is moved along the optical axis for focusing and a vibration reducing lens group that is movable to include a component in a direction perpendicular to the optical axis, thereby correcting displacement in an imaging position. Thus, various aberrations can be corrected superbly from upon focusing on an infinitely distant object to upon focusing on a close distance object. Moreover, various aberrations can be corrected superbly when correction of displacement in an imaging position caused by a camera shake or the like is conducted.

In the variable magnification optical system according to the first embodiment of the present application, it is preferable that said first lens group comprises the vibration reducing lens at the image side of the focusing lens. With this configuration, various aberrations can be corrected superbly from upon focusing on an infinitely distant object to upon focusing on a close distance object. Moreover, various aberrations can be corrected superbly when correction of displacement in an imaging position caused by a camera shake or the like is conducted.

Further, in the variable magnification optical system according to the first embodiment of the present application, it is preferable that the position of said first lens group with respect to the imaging plane is fixed upon varying magnification, thereby it being possible to correct superbly various aberrations upon varying magnification.

Furthermore, in the variable magnification optical system according to the first embodiment of the present application, it is preferable that the following conditional expression (1-1) is satisfied:

$$0.2 < f1/fF < 3.5 \quad (1\text{-}1)$$

where f1 denotes a focal length of the first lens group, and fF denotes a focal length of the focusing lens group.

The conditional expression (1-1) defines the focal length of the first lens group relative to the focal length of the focusing lens group. In the variable magnification optical system according to the first embodiment of the present application, by satisfying the conditional expression (1-1), it is possible to correct superbly various aberrations from upon focusing on an infinitely distant object to upon focusing on a close distance object.

When the value of f1/fF is equal to or exceeds the upper limit of the conditional expression (1-1), refractive power of the focusing lens group becomes too large, and variation in spherical aberration upon focusing on an infinitely distant object to a close distance object is increased. Meanwhile, in order to ensure the advantageous effect of the present embodiment, it is preferable to set the upper limit value of the conditional expression (1-1) to 3.0.

On the other hand, when the value of f1/fF is equal to or falls below the lower limit of the conditional expression (1-1), refractive power of the first lens group becomes large, and it becomes difficult to correct spherical aberration and other various aberrations. Further, refractive power of the focusing lens group becomes weak, and amount of movement of the focusing lens group for focusing on an infinite distance object to a close distance object is increased so that the optical system becomes large in size. Meanwhile, in order to ensure the advantageous effect of the present embodiment, it is preferable to set the lower limit value of the conditional expression (1-1) to 0.6.

Furthermore, in the variable magnification optical system according to the first embodiment of the present application, it is preferable that the focusing lens group has at least two lens components each having positive refractive power. By such a configuration, it is possible to suppress variation in spherical aberration upon focusing on an infinite distance object to a close distance object.

Furthermore, in the variable magnification optical system according to the first embodiment of the present application, it is preferable that the following conditional expression (1-2) is satisfied:

$$0.2 < |f1/fVR| < 2.0 \quad (1\text{-}2)$$

where f1 denotes the focal length of the first lens group, and fVR denotes a focal length of the vibration reducing lens group.

The conditional expression (1-2) defines the focal length of the first lens group relative to the focal length of the vibration reducing lens group. In the variable magnification optical system according to the first embodiment of the present application, by satisfying the conditional expression (1-2), it is possible to correct superbly various aberrations upon correcting displacement of an imaging position caused by a camera shake or the like.

When the value of |f1/fVR| is equal to or exceeds the upper limit of the conditional expression (1-2), refractive power of the vibration reducing lens group becomes large, and generation of eccentric aberration at the time when the vibration reducing lens is moved eccentrically becomes excessive, thereby correction of the eccentric aberration becoming difficult. Meanwhile, in order to ensure the advantageous effect of the present embodiment, it is preferable to set the upper limit value of the conditional expression (1-2) to 1.7.

On the other hand, when the value of |f1/fVR| is equal to or falls below the lower limit of the conditional expression (1-2), refractive power of the first lens group becomes large, and it becomes difficult to correct spherical aberration and other various aberrations. Further, refractive power of the vibration reducing lens group becomes weak, and amount of eccentric movement of the vibration reducing lens group for correcting the displacement of the imaging position caused by a camera shake or the like, becomes too large so that generation of eccentric aberration becomes excessive, and correction becomes difficult. Meanwhile, in order to ensure the advantageous effect of the present embodiment, it is preferable to set the lower limit value of the conditional expression (1-2) to 0.5.

Further, it is preferable that the variable magnification optical system according to the first embodiment of the present application comprises, in order from an object side along the optical axis, said first lens group, a second lens group having negative refractive power, a third lens group having positive refractive power, and a fourth lens group having negative refractive power; wherein upon zooming from a wide-angle end state to a telephoto end state, the second lens group is moved toward the image side and the fourth lens group is moved toward the object side. With such a configuration, it is possible to attain desired variable magnification ratio and correct superbly various aberrations upon varying magnification from the wide angle end state to the telephoto end state.

Further, in the variable magnification optical system according to the first embodiment of the present application, it is preferable that the following conditional expressions (1-3) is satisfied:

$$1.2 < (-f2)/f3 < 2.5 \quad (1\text{-}3)$$

where f2 denotes a focal length of the second lens group, and f3 denotes a focal length of the third lens group.

The conditional expression (1-3) defines the focal length of the second lens group relative to the focal length of the third lens group. In the variable magnification optical system according to the first embodiment of the present application, by satisfying the conditional expression (1-3), it is possible to correct superbly various aberrations from the wide angle end state to the telephoto end state.

When the value of (—f2)/f3 is equal to or exceeds the upper limit of the conditional expression (1-3), refractive power of the third lens group becomes large, and it becomes difficult to correct superbly coma aberration at the wide angle end state. Meanwhile, in order to ensure the advantageous effect of the present embodiment, it is preferable to set the upper limit value of the conditional expression (1-3) to 2.1.

On the other hand, when the value of (—f2)/f3 is equal to or falls below the lower limit of the conditional expression (1-3), refractive power of the second lens group becomes large, and it becomes difficult to correct spherical aberration at the wide angle end state or at the telephoto end state. Meanwhile, in order to ensure the advantageous effect of the present embodiment, it is preferable to set the lower limit value of the conditional expression (1-3) to 1.4.

An optical apparatus of the present application comprises the variable magnification optical system having the above described configuration according to the aforementioned first embodiment. By such configuration, it is possible to realize an optical apparatus having a high optical performance from upon focusing on an infinite distance object to upon focusing on a close distance object and a high optical performance upon correcting displacement of an imaging position caused by a camera shake or the like.

A method for manufacturing a variable magnification optical system according to the first embodiment of the present application is a method for manufacturing a variable magnification optical system which comprises, in order from an object side along the optical axis, a first lens group having positive refractive power, and at least one lens group, the method comprising the steps of: constructing said first lens group to comprise a focusing lens group which is moved along the optical axis for focusing and a vibration reducing lens group that is movable to include a component in a direction perpendicular to the optical axis; and constructing such that, upon varying magnification, an interval between the first lens group and a lens group at an image side of and adjacent to the first lens group is varied. By this method, it is possible to manufacture an optical apparatus having a high optical performance from upon focusing on an infinite distance object to upon focusing on a close distance object and a high optical performance upon correcting displacement of an imaging position caused by a camera shake or the like.

Hereinafter, a variable magnification optical system, an optical apparatus and a method for manufacturing the variable magnification optical system, according to the second embodiment of the present application are explained. At first, the variable magnification optical system according to the second embodiment of the present application is explained.

The variable magnification optical system according to the second embodiment of the present application comprises, in order from an object side along the optical axis: a first lens group having positive refractive power, a second lens group having negative refractive power, a third lens group having positive refractive power and at least one lens group; upon varying magnification, an interval between the first lens group and the second lens group being varied, an interval between the second lens group and the third lens group being varied, and an interval between the third lens group and a lens group at an image side of the third lens group and adjacent thereto being varied; said first lens group comprising a focusing lens group which is moved along the optical axis for focusing; said variable magnification optical system further comprising a vibration reducing lens group that is movable to include a component in a direction perpendicular to the optical axis; and the following conditional expression (2-1) being satisfied:

$$0.2 < f1/(-f2) < 2.00 \quad (2\text{-}1)$$

where f1 denotes a focal length of the first lens group, and f2 denotes a focal length of the second lens group.

In the variable magnification optical system according to the second embodiment of the present application, as described above, upon varying magnification, the interval between the first lens group and the second lens group is varied, the interval between the second lens group and the third lens group is varied, and the interval between the third lens group and the lens group at an image side of the third lens group and adjacent thereto is varied. Thus, in the variable magnification optical system according to the second embodiment of the present application, upon varying magnification, the interval between the neighboring lens groups is varied, so various aberrations being able to be excellently corrected. In particular, in the variable magnification optical system according to the second embodiment of the present application, upon varying magnification from a wide angle end state to a telephoto end state, the interval between the first lens group and the second lens group is increased, the interval between the second lens group and the third lens group is decreased, and the interval between the third lens group and the lens group at the image side of the third lens group and adjacent thereto is decreased, whereby a predetermined variable magnification ratio is secured.

Further, in the variable magnification optical system according to the second embodiment of the present application, the first lens group comprises a focusing lens group that is moved along the optical axis upon focusing, thereby it being possible to correct excellently various aberrations from upon focusing on an infinite distance object to upon focusing a close distance object.

Further, the variable magnification optical system according to the second embodiment of the present application, comprises a vibration reduction lens group for correcting displacement of an imaging position by moving to include a component in a direction perpendicular to the optical axis. Thus, it is possible to correct various aberrations upon correcting displacement of the imaging position caused by a camera shake and the like.

The conditional expression (2-1) defines the focal length of the first lens group relative to the focal length of the second lens group. In the variable magnification optical system according to the second embodiment of the present application, by satisfying the conditional expression (2-1), it is possible to correct superbly various aberrations upon varying magnification from a wide angle end state to a telephoto end state.

When the value of f1/(—f2) is equal to or exceeds the upper limit of the conditional expression (2-1), refractive power of the second lens group becomes too large, and correction of spherical aberration in the wide angle end state or in the telephoto end state becomes difficult. Meanwhile, in order to ensure the advantageous effect of the present embodiment, it is preferable to set the upper limit value of the conditional expression (2-1) to 1.6.

On the other hand, when the value of f1/(—f2) is equal to or falls below the lower limit of the conditional expression (2-1), refractive power of the first lens group becomes large, and it becomes difficult to correct spherical aberration and other various aberrations. Meanwhile, in order to ensure the advantageous effect of the present embodiment, it is preferable to set the lower limit value of the conditional expression (2-1) to 0.5.

Furthermore, in the variable magnification optical system according to the second embodiment of the present application, it is preferable that the first lens group has a vibration reducing lens group that is movable to have a component in a direction perpendicular to the optical axis, thereby it being possible to correct excellently various aberrations upon correcting displacement of the imaging position caused by a camera shake or the like.

Furthermore, in the variable magnification optical system according to the second embodiment of the present application, it is preferable that the first lens group has the vibration reducing lens group at the image side of the focusing lens group, thereby it being possible to correct excellently various aberrations upon focusing on a infinite distance object to focusing on a close distance object. Further, it is possible to correct excellently various aberrations upon correcting displacement of the imaging position caused by a camera shake or the like.

Furthermore, in the variable magnification optical system according to the second embodiment of the present application, it is preferable that a position of the first lens group is fixed upon varying magnification. By such a configuration, it is possible to correct various aberrations upon varying magnification.

Further, in the variable magnification optical system according to the second embodiment of the present application, it is preferable that the following conditional expressions (2-2) is satisfied:

$$1.2 < (-f2)/f3 < 2.5 \quad (2\text{-}2)$$

where f2 denotes a focal length of the second lens group, and f3 denotes a focal length of the third lens group.

The conditional expression (2-2) defines the focal length of the second lens group relative to the focal length of the third lens group. In the variable magnification optical system according to the second embodiment of the present application, by satisfying the conditional expression (2-2), it is possible to correct superbly various aberrations from the wide angle end state to the telephoto end state.

When the value of (−f2)/f3 is equal to or exceeds the upper limit of the conditional expression (2-2), refractive power of the third lens group becomes large, and it becomes difficult to correct coma aberration at the wide angle end state. Meanwhile, in order to ensure the advantageous effect of the present embodiment, it is preferable to set the upper limit value of the conditional expression (2-2) to 2.1.

On the other hand, when the value of (−f2)/f3 is equal to or falls below the lower limit of the conditional expression (2-2), refractive power of the second lens group becomes large, and it becomes difficult to correct spherical aberration in the wide angle end state or in the telephoto end state. Meanwhile, in order to ensure the advantageous effect of the present embodiment, it is preferable to set the lower limit value of the conditional expression (2-2) to 1.4.

Furthermore, in the variable magnification optical system according to the second embodiment of the present application, it is preferable that the following conditional expression (2-3) is satisfied:

$$0.2 < |f1/fVR| < 2.0 \quad (2\text{-}3)$$

where f1 denotes the focal length of the first lens group, and fVR denotes a focal length of the vibration reducing lens group.

The conditional expression (2-3) defines the focal length of the first lens group relative to the focal length of the vibration reducing lens group. In the variable magnification optical system according to the second embodiment of the present application, by satisfying the conditional expression (2-3), it is possible to correct superbly various aberrations upon correcting displacement of an imaging position caused by a camera shake or the like.

When the value of |f1/fVR| is equal to or exceeds the upper limit of the conditional expression (2-3), refractive power of the vibration reducing lens group becomes large, and generation of eccentric aberration at the time when the vibration reducing lens is moved eccentrically becomes excessive, thereby correction of the eccentric aberration becoming difficult. Meanwhile, in order to ensure the advantageous effect of the present embodiment, it is preferable to set the upper limit value of the conditional expression (2-3) to 1.7.

On the other hand, when the value of |f1/fVR| is equal to or falls below the lower limit of the conditional expression (2-3), refractive power of the first lens group becomes large, and it becomes difficult to correct spherical aberration and other various aberrations. Further, refractive power of the vibration reducing lens group becomes weak, and amount of eccentric movement of the vibration reducing lens group for correcting the displacement of the imaging position caused by a camera shake or the like, becomes too large so that generation of eccentric aberration becomes excessive, and correction becomes difficult. Meanwhile, in order to ensure the advantageous effect of the present embodiment, it is preferable to set the lower limit value of the conditional expression (2-3) to 0.5.

Further, in the variable magnification optical system according to the second embodiment of the present application, it is preferable that the focusing lens group has at least two lens components each having positive refractive power. With such a configuration, it is possible to suppress variation in spherical aberration upon focusing from an infinite distance object to a close distance object.

Furthermore, in the variable magnification optical system according to the second embodiment of the present application, it is preferable that the following conditional expression (2-4) is satisfied:

$$0.2 < f1/fF < 3.5 \quad (2\text{-}4)$$

where f1 denotes a focal length of the first lens group, and fF denotes a focal length of the focusing lens group.

The conditional expression (2-4) defines the focal length of the first lens group relative to the focal length of the focusing lens group. In the variable magnification optical system according to the second embodiment of the present application, by satisfying the conditional expression (2-4), it is possible to correct superbly various aberrations from upon focusing on an infinitely distant object to upon focusing on a close distance object.

When the value of f1/fF is equal to or exceeds the upper limit of the conditional expression (2-4), refractive power of the focusing lens group becomes large, and variation in spherical aberration upon focusing on an infinitely distant object to a close distance object is increased. Meanwhile, in order to ensure the advantageous effect of the present embodiment, it is preferable to set the upper limit value of the conditional expression (2-4) to 3.0.

On the other hand, when the value of f1/fF is equal to or falls below the lower limit of the conditional expression (2-4), refractive power of the first lens group becomes large, and it becomes difficult to correct spherical aberration and other various aberrations. Further, refractive power of the focusing lens group becomes weak, and amount of movement of the focusing lens group for focusing on an infinite distance object to a close distance object is increased so that the optical system becomes large in size. Meanwhile, in order to ensure the advantageous effect of the present embodiment, it is preferable to set the lower limit value of the conditional expression (2-4) to 0.6.

An optical apparatus of the present application comprises the variable magnification optical system having the above described configuration according to the aforementioned second embodiment. By such configuration, it is possible to realize an optical apparatus having a high optical performance from upon focusing on an infinite distance object to upon focusing on a close distance object and a high optical performance upon correcting displacement of an imaging position caused by a camera shake or the like.

A method for manufacturing a variable magnification optical system according to the second embodiment of the present application is a method for manufacturing a variable magnification optical system which comprises, in order from an object side along the optical axis, a first lens group having positive refractive power, a second lens group having negative refractive power, a third lens group having positive refractive power, and at least one lens group, the method comprising the steps of: constructing said first lens group to comprise a focusing lens group which is moved along the optical axis for focusing; constructing said variable magnification optical system to comprise further a vibration reducing lens group that is movable to include a component in a direction perpendicular to the optical axis; constructing such that the following conditional expression (2-1) is satisfied:

$$0.2 < f1/(-f2) < 2.00 \qquad (2-1)$$

where f1 denotes a focal length of the first lens group, and f2 denotes a focal length of the second lens group; and constructing such that, upon varying magnification, an interval between the first lens group and the second lens group is varied, an interval between the second lens group and the third lens group is varied, and an interval between the third lens group and a lens group at the image side of the third lens group and adjacent thereto is varied. With such configuration, it is possible to manufacture a variable magnification optical system which has a high optical performance from upon focusing on an infinite distance object to upon focusing on a close distance object and a high optical performance upon correcting displacement of an imaging position caused by a camera shake or the like.

Next, a variable magnification optical system, an optical apparatus and a method for manufacturing the variable magnification optical system, according to the third embodiment of the present application are explained. At first, the variable magnification optical system according to the third embodiment of the present application is explained.

The variable magnification optical system according to the third embodiment of the present application comprises, in order from an object side along the optical axis, a first lens group having positive refractive power and at least one lens group; upon varying magnification, an interval between the first lens group and a lens group at the image side of the first lens group and adjacent thereto being varied; said first lens group comprising, in order from the object side, a front group having negative refractive power and a focusing lens group which is moved along the optical axis for focusing; and the following conditional expression (3-1) being satisfied:

$$1.0 < f1/(-f11) < 2.5 \qquad (3-1)$$

where f1 denotes a focal length of the first lens group, and f11 denotes a focal length of the front group.

In the variable magnification optical system according to the third embodiment of the present application, as described above, upon varying magnification, the interval between the first lens group and the lens group at the image side of the first lens group and adjacent thereto is varied. In the variable magnification optical system according to the third embodiment of the present application, with such a configuration, various aberrations can be excellently corrected upon varying magnification. In particular, in the variable magnification optical system according to the third embodiment of the present application, the interval between the first lens group and the lens group at the image side of the first lens group and adjacent thereto is varied, whereby a predetermined variable magnification ratio is secured.

Further, in the variable magnification optical system according to the third embodiment of the present application, the first lens group comprises, in order from the optical axis, a front group having negative refractive power and a focusing lens group that is moved along the optical axis upon focusing. In the variable magnification optical system according to the third embodiment of the present application, the focusing lens group is arranged in the first lens group as described, thereby it being possible to correct excellently various aberrations from upon focusing on an infinite distance object to upon focusing a close distance object.

The conditional expression (3-1) defines the focal length of the first lens group relative to the focal length of the front group having negative refractive power in the first lens group. By satisfying the conditional expression (3-1), it is possible to correct superbly various aberrations upon from focusing on an infinitely distance object to upon focusing on a close distance object.

When the value of f1/(−f11) is equal to or exceeds the upper limit of the conditional expression (3-1), refractive power of the front group having negative refractive power becomes large, and generation of spherical aberration and other aberrations become excessive, so correction by the focusing group become necessary. However, if corrections are intended to be made by the focusing group, variation in spherical aberration upon focusing on from an infinitely distance object to a close distance object, is increased. Meanwhile, in order to ensure the advantageous effect of the present embodiment, it is preferable to set the upper limit value of the conditional expression (3-1) to 2.0.

On the other hand, when the value of f1/(−f11) is equal to or falls below the lower limit of the conditional expression (3-1), refractive power of the first lens group becomes large, and it becomes difficult to correct spherical aberration and other various aberrations. Meanwhile, in order to ensure the advantageous effect of the present embodiment, it is preferable to set the lower limit value of the conditional expression (3-1) to 1.2.

Furthermore, in the variable magnification optical system according to the third embodiment of the present application, it is preferable that the first lens group has a vibration reducing lens group that is movable to have a component in a direction perpendicular to the optical axis, thereby it being possible to correct excellently various aberrations upon correcting displacement of the imaging position caused by a camera shake or the like.

Furthermore, in the variable magnification optical system according to the third embodiment of the present application, it is preferable that the first lens group has the vibration reducing lens group at the image side of the focusing lens group, thereby it being possible to correct excellently various aberrations upon focusing on an infinite distance object to focusing on a close distance object. Further, it is possible to correct excellently various aberrations upon correcting displacement of the imaging position caused by a camera shake or the like.

Furthermore, in the variable magnification optical system according to the third embodiment of the present application, it is preferable that a position of the first lens group is fixed upon varying magnification. By such a configuration, it is possible to correct various aberrations upon varying magnification.

Furthermore, in the variable magnification optical system according to the third embodiment of the present application, it is preferable that the following conditional expression (3-2) is satisfied:

$$0.2 < f1/fF < 3.5 \qquad (3\text{-}2)$$

where f1 denotes a focal length of the first lens group, and fF denotes a focal length of the focusing lens group.

The conditional expression (3-2) defines the focal length of the first lens group relative to the focal length of the focusing lens group. In the variable magnification optical system according to the third embodiment of the present application, by satisfying the conditional expression (3-2), it is possible to correct superbly various aberrations from upon focusing on an infinitely distance object to upon focusing on a close distance object.

When the value of f1/fF is equal to or exceeds the upper limit of the conditional expression (3-2), refractive power of the focusing lens group becomes large, and variation in spherical aberration upon focusing on an infinitely distance object to a close distance object is increased. Meanwhile, in order to ensure the advantageous effect of the present embodiment, it is preferable to set the upper limit value of the conditional expression (3-2) to 3.0.

On the other hand, when the value of f1/fF is equal to or falls below the lower limit of the conditional expression (3-2), refractive power of the first lens group becomes large, and it becomes difficult to correct spherical aberration and other various aberrations. Further, refractive power of the focusing lens group becomes weak, and amount of movement of the focusing lens group for focusing on an infinite distance object to a close distance object is increased so that the optical system becomes large in size. Meanwhile, in order to ensure the advantageous effect of the present embodiment, it is preferable to set the lower limit value of the conditional expression (3-2) to 0.6.

Furthermore, in the variable magnification optical system according to the third embodiment of the present application, it is preferable that the focusing lens group has at least two lens components each having positive refractive power. By such a configuration, it is possible to suppress variation in spherical aberration upon focusing on an infinite distance object to a close distance object.

Furthermore, in the variable magnification optical system according to the third embodiment of the present application, it is preferable that the first lens group comprises further a lens group at an image side of the focusing lens group. By such a configuration, it is possible to correct spherical aberration upon focusing on an infinite distance object to a close distance object.

Furthermore, it is preferable that the variable magnification optical system according to the third embodiment of the present application comprises, in order from the object side along the optical axis, the first lens group, a second lens group having negative refractive power, a third lens group having positive refractive power and a fourth lens group having negative refractive power; upon varying magnification from a wide angle end state to a telephoto end state, the second lens group being moved toward the image side and the fourth lens group being moved toward the object side. By such a configuration, it is possible to attain a predetermined variable magnification ratio and correct superbly various aberrations from the wide angle end state to the telephoto end state.

Further, in the variable magnification optical system according to the third embodiment of the present application, it is preferable that the following conditional expressions (3-3) is satisfied:

$$1.2 < (-f2)/f3 < 2.5 \qquad (3\text{-}3)$$

where f2 denotes a focal length of the second lens group, and f3 denotes a focal length of the third lens group.

The conditional expression (3-3) defines the focal length of the second lens group relative to the focal length of the third lens group. In the variable magnification optical system according to the third embodiment of the present application, by satisfying the conditional expression (3-3), it is possible to correct superbly various aberrations from the wide angle end state to the telephoto end state.

When the value of $(-f2)/f3$ is equal to or exceeds the upper limit of the conditional expression (3-3), refractive power of the third lens group becomes large, and it becomes difficult to correct superbly coma aberration at the wide angle end state. Meanwhile, in order to ensure the advantageous effect of the present embodiment, it is preferable to set the upper limit value of the conditional expression (3-3) to 2.1.

On the other hand, when the value of $(-f2)/f3$ is equal to or falls below the lower limit of the conditional expression (3-3), refractive power of the second lens group becomes large, and it becomes difficult to correct spherical aberration at the wide angle end state or at the telephoto end state. Meanwhile, in order to ensure the advantageous effect of the present embodiment, it is preferable to set the lower limit value of the conditional expression (3-3) to 1.4.

An optical apparatus of the present application comprises the variable magnification optical system having the above described configuration according to the aforementioned third embodiment. By such configuration, it is possible to realize an optical apparatus having a high optical performance from upon focusing on an infinite distance object to upon focusing on a close distance object.

A method for manufacturing a variable magnification optical system according to the third embodiment of the present application is a method for manufacturing a variable magnification optical system which comprises, in order from an object side along the optical axis, a first lens group having positive refractive power and at least one lens group, the method comprising the steps of: constructing said first lens group to comprise, in order from the object side along the optical axis, a front group having negative refractive power and a focusing lens group which is moved along the optical axis for focusing; constructing such that the following conditional expression (3-1) being satisfied:

$$1.0 < f1/(-f11) < 2.5 \qquad (3\text{-}1)$$

where f1 denotes a focal length of the first lens group, and f11 denotes a focal length of the front group; and constructing such that, upon varying magnification, an interval between the first lens group and a lens group at the image side of the first lens group and adjacent thereto is varied, whereby it is possible to manufacture a variable magnification optical system having a high optical performance from upon focusing on an infinite distance object to upon focusing on a close distance object.

NUMERICAL EXAMPLES

Hereinafter, variable magnification optical systems relating to numerical examples which are common to the first to the third embodiments of the present application will be explained with reference to the accompanying drawings.

First Example

FIG. 1 is a sectional view showing a lens configuration of a variable magnification optical system according to the First Example which is common to the first to the third embodiments of the present application. Meanwhile, arrows in FIG. 1 and FIG. 6 described hereinafter shows moving trajectory of each lens upon varying magnification from a wide angle end state (W) to a telephoto end state (T).

The variable magnification optical system according to the present Example is composed of, in order from an object side along the optical axis, a first lens group G1 having positive refractive power, a second lens group G2 having negative refractive power, a third lens group G3 having positive refractive power and a fourth lens group G4 having negative refractive power.

The first lens group G1 consists of, in order from the object side along the optical axis, a front group G11 having negative refractive power, a focusing lens group GF having positive refractive power and a rear group G12 having positive refractive power.

The front group G11 consists of, in order from the object side along the optical axis, a cemented negative lens constructed by a plano-concave negative lens L101 having a concave surface facing the image side cemented with a positive meniscus lens L102 having a convex surface facing the object side, and a negative meniscus lens L103 having a concave surface facing the object side.

The focusing lens group GF consists of, in order from the object side along the optical axis, a double convex positive lens L104, a double convex positive lens L105, a positive meniscus lens L106 having a convex surface facing the object side and a negative meniscus lens L107 having a convex surface facing the object side.

The rear group G12 consists of, in order from the object side along the optical axis, a fixed lens group G121 having positive refractive power, an aperture stop S and a vibration reducing lens group GVR having positive refractive power.

The fixed lens group G121 consists of, in order from the object side along the optical axis, a positive meniscus lens L108 having a convex surface facing the object side and a negative meniscus lens L109 having a concave surface facing the object side.

The vibration reducing lens group GVR consists of, in order from the object side along the optical axis, a cemented positive lens constructed by a double convex positive lens L110 cemented with a negative meniscus lens L111 having a concave surface facing the object side. The positive lens L110 has an aspherical lens surface facing the object side.

The second lens group G2 consists of, in order from the object side along the optical axis, a double concave negative lens L201 and a positive meniscus lens L202 having a concave surface facing the object side.

The third lens group G3 consists of, in order from the object side along the optical axis, a cemented positive lens constructed by a negative meniscus lens L301 having a convex surface facing the object side cemented with a double convex positive lens L302.

The fourth lens group G4 consists of, in order from the object side along the optical axis, a cemented negative lens constructed by a double concave negative lens L401 cemented with a double convex positive lens L402.

With the above-mentioned configuration, in the variable magnification optical system according to the present Example, upon varying magnification from the wide-angle end state to the telephoto end state, the second lens group G2 is moved toward the image side along the optical axis and the fourth lens group G4 is moved toward the object side along the optical axis such that an air interval between the first lens group G1 and the second lens group G2 is increased, an air interval between the second lens group G2 and the third lens group G3 is decreased, and an air interval between the third lens group G3 and the fourth lens group G4 is decreased.

At this time, the first lens group G1 and the third lens group G3 are fixed in the respective positions in the direction of the optical axis.

In the variable magnification optical system according to the present Example, focusing from an infinitely distance object to a close distance object is carried out by moving the focusing lens group GF in the first lens group G1 toward the image side along the optical axis.

Further, in the variable magnification optical system according to the present Example, vibration reduction is conducted by moving the vibration reducing lens GVR in the rear group G12 to have a component in a direction perpendicular to the optical axis.

Here, in an entire lens system having a focal length of f, a vibration reduction coefficient (which is a ratio of a moving amount of an image on the image plane I to that of the vibration reducing lens group) of K, in order to correct rotational camera shake of an angle θ, the vibration reducing lens group for correcting the camera shake may be moved by the amount of (f·tan θ)/K perpendicularly to the optical axis. Accordingly, in the wide-angle end state of the variable magnification optical system according to the present Example, the vibration reduction coefficient K is 1.40, and the focal length is 93.4 (mm) (See Table 1 below), so that the moving amount of the vibration reducing lens group GVR for correcting a rotational camera shake of 0.30 degrees is 0.35 (mm). In the telephoto end state, the vibration reduction coefficient K is 2.09, and the focal length is 138.9 (mm) (See Table 1 below), so that the moving amount of the vibration reducing lens group GVR for correcting a rotational camera shake of 0.20 degrees is 0.23 (mm).

Various values of the variable magnification optical system according to the present Example, are listed in Table 1 below.

In Table 1, f denotes a focal length, and BF denotes a back focal length, that is, a distance from a most image side lens surface to the image plane I.

In [Surface Data], "m" shows the lens surface number counted in order from the object side, "r" shows a radius of curvature, "d" shows a face to face distance (that is, a distance from n-th surface (n is an integer) to (n+1)-th surface, "nd" shows refractive index of the material at d-line (wavelength λ=587.6 nm), and "vd" shows Abbe number of the material at d-line (wavelength λ=587.6 nm). OP denotes an object surface, "Variable" denotes a variable face to face distance, S denotes an aperture stop, and I denotes an image plane. Meanwhile, radius of curvature r=∞ denotes a plane surface, and regarding an aspherical surface, value of a paraxial radius of curvature, is expressed in the column of the radius of curvature with attaching "*" to the surface number. Refractive index of the air nd=1.000000 is omitted.

In [Aspherical Data], with respect to an aspherical surface shown in [Surface data], an aspherical surface coefficient and a corn constant are shown in the case where the aspherical surface is exhibited by the following expression:

$$X=(h^2/r)/[1+[1-\kappa(h^2/r^2)]^{1/2}]+A4 \times h^4+A6 \times h^6+A8 \times h^8+A10 \times h^{10}$$

where h denotes a vertical height from the optical axis, X denotes a sag amount which is a distance along the optical axis from the tangent surface at the vertex of the aspherical surface to the aspherical surface at the vertical height h from the optical axis, κ denotes a conical constant, A4, A6, A8 and A10 each denotes aspherical coefficient, r denotes a radius of curvature of a reference sphere (a paraxial radius of curvature), "E-n" (n is an integer) denotes "×10$^{-n}$", for example, "1.234E-5" denotes "1.234×10$^{-5}$". Aspherical coefficient A2 of the second order is 0 and omitted.

In [Various Data], FNO denotes an F-number, 2ω denotes an angle of view in degrees, Ymax denotes a maximum image height, TL denotes a total length of the variable magnification optical system of the present Example, that is, a distance on the optical axis from the 1-st surface to the image plane I, and "dn" denotes a face to face distance between the n-th surface (n is an integer) to the (n+1)-th surface. Meanwhile, W denotes a wide-angle end state, T denotes a telephoto end state, INF denotes time upon focusing on an infinite distance object, INT denotes time upon focusing on an intermediate distance object, and CLO denotes time focusing on a close distance object. "ß" denotes a shooting magnification and dO denotes a distance from the object to the 1-st surface.

In [Lens Group Data], a starting surface number ST and a focal length f of each lens group are shown.

In [Values for Conditional Expressions], the respective values for the conditional expressions are shown.

Here, In the Table 1 for "mm" is generally used for the unit of length such as the focal length "f", the radius of curvature "r" and others. However, since similar optical performance can be obtained by an optical system proportionally enlarged or reduced its dimension; the unit is not necessarily to be limited to "mm".

Meanwhile, symbols used Table 1 described above, are similarly used with respect to the respective examples described later.

TABLE 1

First Example

[Surface Data]

| m | r | d | nd | vd |
|---|---|---|----|----|
| OP | ∞ | | | |
| 1) | ∞ | 1.000 | 1.77250 | 49.62 |
| 2) | 38.0487 | 4.926 | 1.84666 | 23.78 |
| 3) | 92.6329 | 4.033 | | |
| 4) | −79.5970 | 1.000 | 1.80400 | 46.60 |
| 5) | −1847.4278 | Variable | | |
| 6) | 439.1344 | 4.550 | 1.60300 | 65.44 |
| 7) | −79.0578 | 0.200 | | |
| 8) | 70.0266 | 4.476 | 1.59319 | 67.90 |
| 9) | −1174.3767 | 0.924 | | |
| 10) | 30.2852 | 5.401 | 1.51680 | 63.88 |
| 11) | 80.2486 | 7.041 | | |
| 12) | 89.7685 | 1.000 | 1.80100 | 34.92 |
| 13) | 26.2728 | Variable | | |
| 14) | 38.2542 | 3.107 | 1.71999 | 50.27 |
| 15) | 74.6638 | 2.363 | | |

TABLE 1-continued

First Example

| 16) | −63.7530 | 1.000 | 1.78472 | 25.64 |
|---|---|---|---|---|
| 17) | −218.9616 | 1.761 | | |
| 18) (S) | ∞ | 1.494 | | |
| *19) | 99.6511 | 4.239 | 1.74300 | 49.25 |
| 20) | −52.5406 | 1.000 | 1.80518 | 25.45 |
| 21) | −90.0254 | Variable | | |
| 22) | −65.1159 | 1.000 | 1.80610 | 40.97 |
| 23) | 74.9909 | 1.590 | | |
| 24) | −145.6105 | 8.500 | 1.84666 | 23.78 |
| 25) | −51.3339 | Variable | | |
| 26) | 91.8683 | 1.000 | 1.84666 | 23.78 |
| 27) | 38.8688 | 8.000 | 1.73400 | 51.51 |
| 28) | −73.0564 | Variable | | |
| 29) | −51.7878 | 1.000 | 1.80610 | 40.97 |
| 30) | 34.9316 | 6.503 | 1.84666 | 23.78 |
| 31) | −2161.1855 | BF | | |
| I | ∞ | | | |

[Aspherical Data]
m: 19

K = 1.0000
A4 = −1.19910E−06
A6 = 6.97302E−10
A8 = −8.64409E−13
A10 = 0.00000E+00

[Various Data]
Variabl magnification Ratio 1.49

| | W | T |
|---|---|---|
| f | 93.38 | 138.92 |
| FNO | 4.64 | 5.84 |
| 2ω | 26.52 | 17.42 |
| Ymax | 21.60 | 21.60 |
| TL | 209.56 | 209.56 |
| BF | 38.52 | 64.02 |

| | W INF | T INF | W INT | T INT | W CLO | T CLO |
|---|---|---|---|---|---|---|
| β | 0 | 0 | −0.336 | −0.500 | −0.672 | −1.000 |
| d0 | ∞ | ∞ | 227.867 | 227.867 | 88.271 | 88.271 |
| d5 | 1.571 | 1.571 | 14.171 | 14.171 | 25.608 | 25.608 |
| d13 | 26.134 | 26.134 | 13.534 | 13.534 | 2.096 | 2.096 |
| d21 | 3.166 | 35.238 | 3.166 | 35.238 | 3.166 | 35.238 |
| d25 | 34.072 | 2.000 | 34.072 | 2.000 | 34.072 | 2.000 |
| d28 | 28.995 | 3.499 | 28.995 | 3.499 | 28.995 | 3.499 |

[Lens Group Data]

| Group | ST | f |
|---|---|---|
| 1 | 1 | 84.190 |
| 2 | 22 | −101.684 |
| 3 | 26 | 62.362 |
| 4 | 29 | −71.534 |

[Values for Conditional Expressions]

(1-1) f1/fF = 1.345
(1-2) |f1/fVR| = 1.267
(1-3) (−f2)/f3 = 1.631
(2-1) f1/(−f2) = 0.828
(2-2) (−f2)/f3 = 1.631
(2-3) |f1/fVR| = 1.267
(2-4) f1/fF = 1.345
(3-1) f1/(−f11) = 1.434
(3-2) f1/fF = 1.345
(3-3) (−f2)/f3 = 1.631

Figure 2B:
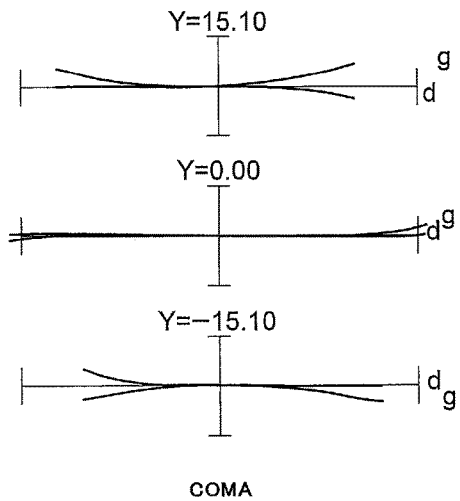

FIGS. 2A and 2B are graphs showing various aberrations of the variable magnification optical system according to the First Example upon focusing on an infinite distance object in the wide-angle end state, and meridional transverse aberration upon correcting image blur for a rotational camera shake of 0.30 degrees, respectively.

Figure 3A:
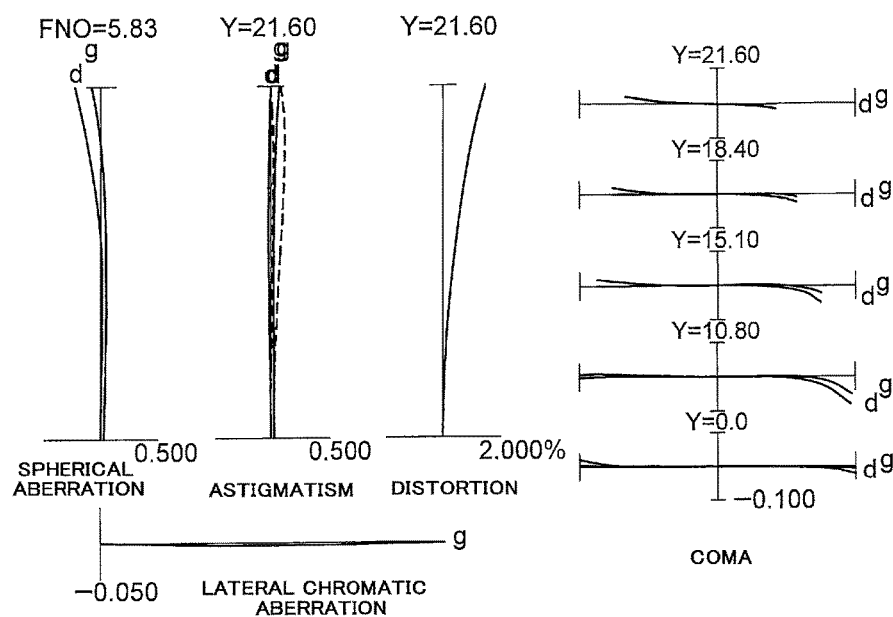
Figure 3B:
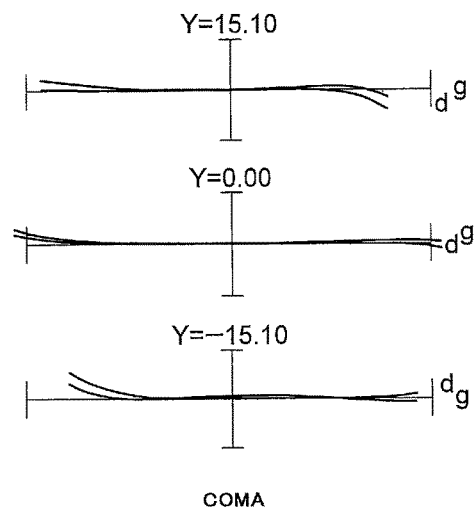

FIGS. 3A and 3B are graphs showing various aberrations of the variable magnification optical system according to the First Example upon focusing on the infinite distance object in the telephoto end state, and meridional transverse aberration upon correcting image blur for a rotational camera shake of 0.20 degrees, respectively.

Figure 4A:
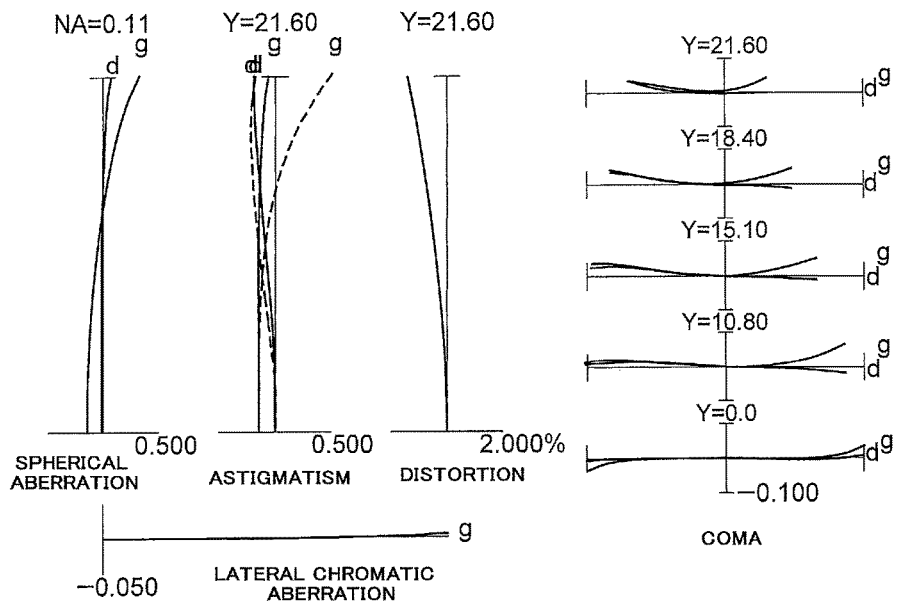
FIGS. 4A and 4B are graphs showing various aberrations of the variable magnification optical system according to the First Example upon focusing on an intermediate distance object in the wide angle end state and in the telephoto end state, respectively.
Figure 4B:
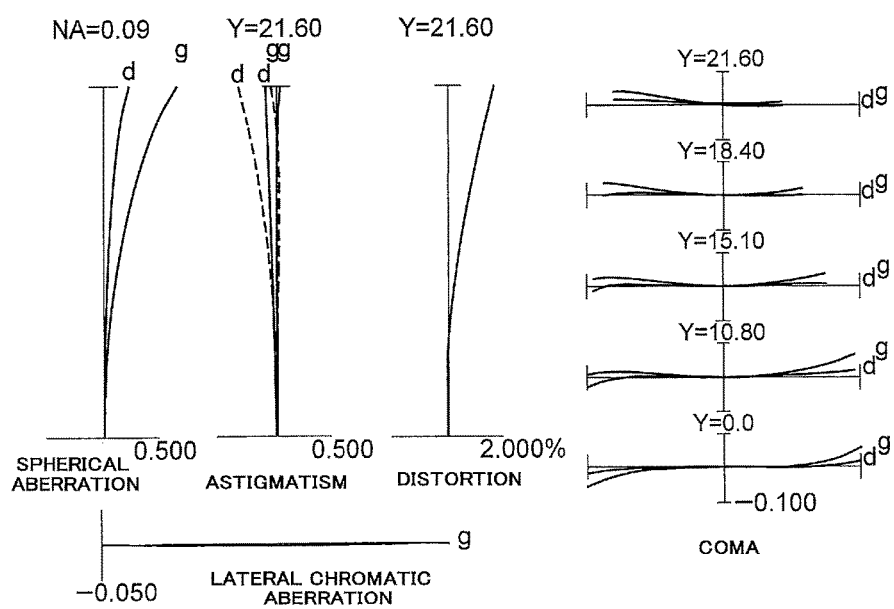

FIGS. 4A and 4B are graphs showing various aberrations of the variable magnification optical system according to the First Example upon focusing on an intermediate distance object in which FIG. 4A shows various aberrations in a wide angle end state, and FIG. 4B shows various aberrations in a telephoto end state.

Figure 5A:
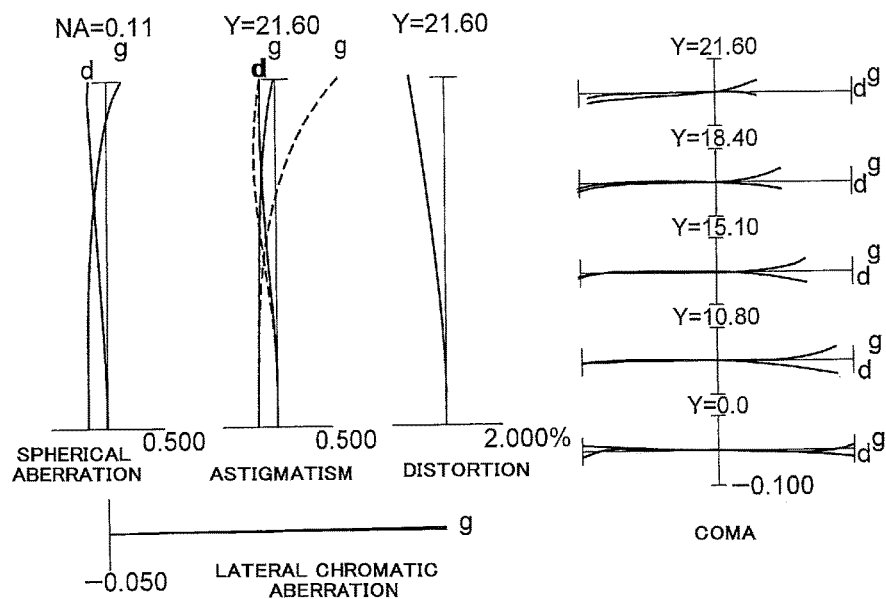
FIGS. 5A and 5B are graphs showing various aberrations of the variable magnification optical system according to the First Example upon focusing on a close distance object in the wide angle end state and in the telephoto end state, respectively.
Figure 5B:
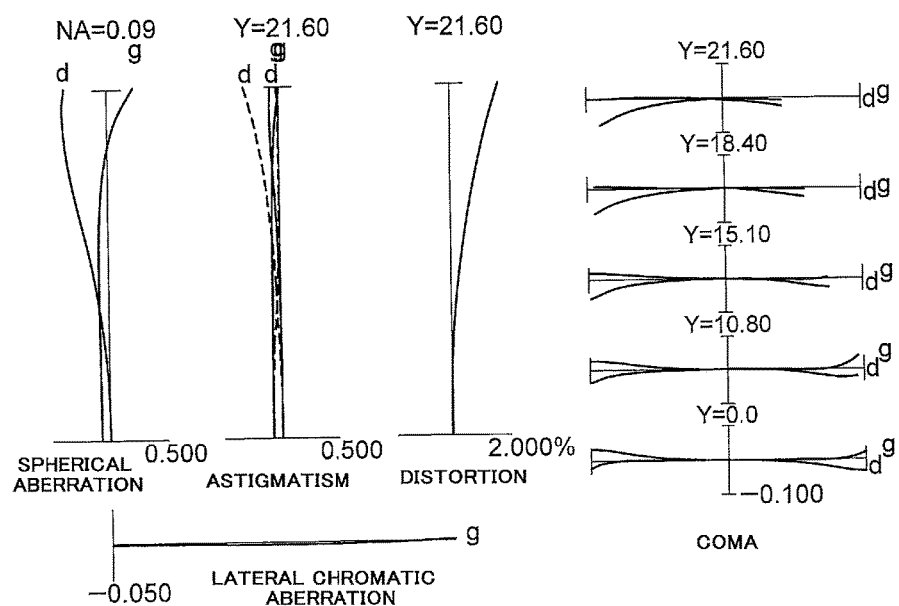

FIGS. 5A and 5B are graphs showing various aberrations of the variable magnification optical system according to the First Example upon focusing on a close distance object in which FIG. 5A shows various aberrations in a wide angle end state, and FIG. 5B shows various aberrations in a telephoto end state.

In respective graphs, FNO denotes an F-number, Y denotes an image height, NA denotes a numerical aperture. In graphs showing an aspherical aberration, F-number FNO or the numerical aperture NA with respect to the maximum aperture is shown. In graphs showing astigmatism and distortion, the maximum value of the image height Y is shown. In graphs showing coma aberration, value with respect to each image height is shown. In respective graphs, d denotes aberration curve at d-line (wavelength $\lambda$=587.6 nm), and g denotes aberration curve at g-line (wavelength $\lambda$=435.8 nm). In graphs showing astigmatism, a solid line indicates a sagittal image plane, and a broken line indicates a meridional image plane. In graphs showing coma aberrations, coma aberration for each image height is shown. The above-described explanations regarding various aberration graphs are the same as the other Examples.

As is apparent from the respective graphs, the variable magnification optical system according to the First Example shows superb optical performance upon focusing on from an infinite distance object to a close distance object, and further superb optical performance even upon correcting displacement of an imaging position caused by a camera shake or the like.

Second Example

Figure 6:
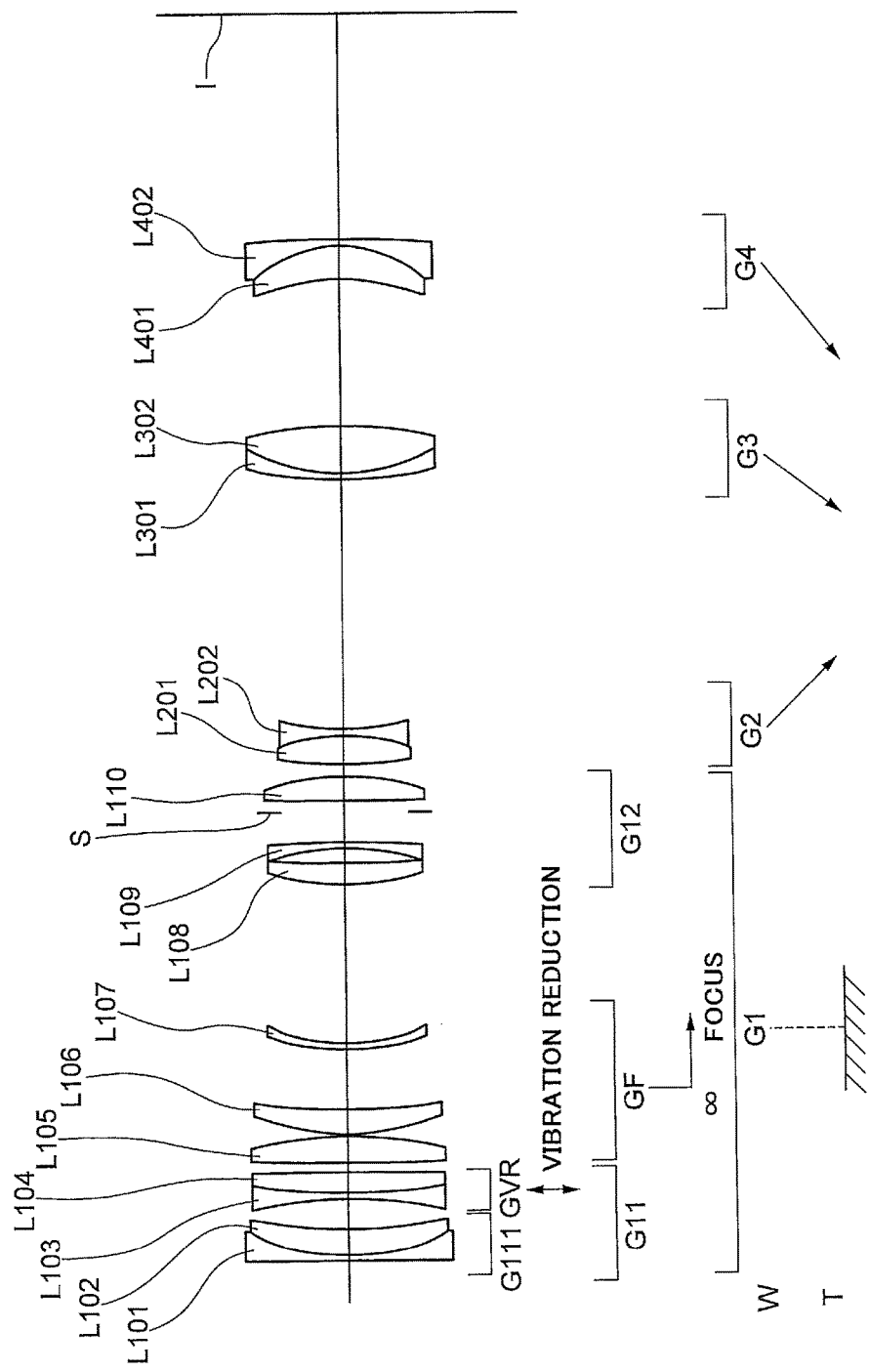
FIG. 6 is a sectional view showing a configuration of a variable magnification optical system according to a Second Example that is common to the first to the third embodiments of the present application.

FIG. 6 is a sectional view showing a lens configuration of a variable magnification optical system according to the Second Example which is common to the first to the third embodiments of the present application.

The variable magnification optical system according to the present Example is composed of, in order from an object side along the optical axis, a first lens group G1 having positive refractive power, a second lens group G2 having negative refractive power, a third lens group G3 having positive refractive power and a fourth lens group G4 having negative refractive power.

The first lens group G1 consists of, in order from the object side along the optical axis, a front group G11 having negative refractive power, a focusing lens group GF having positive refractive power and a rear group G12 having positive refractive power.

The front group G11 consists of, in order from the object side along the optical axis, a fixed lens group G111 having negative refractive power and a vibration reducing lens group GVR having negative refractive power.

The fixed lens group G111 consists of, in order from the object side along the optical axis, a cemented negative lens constructed by a negative meniscus lens L101 having a convex surface facing the object side cemented with a positive meniscus lens L102 having a convex surface facing the object side.

The vibration reducing lens group GVR consists of, in order from the object side along the optical axis, a cemented negative lens constructed by a double concave negative lens L103 cemented with a positive meniscus lens L104 having a convex surface facing the object side.

The focusing lens group GF consists of, in order from the object side along the optical axis, a double convex positive lens L105, a positive meniscus lens L106 having a convex surface facing the object side, and a negative meniscus lens L107 having a convex surface facing the object side.

The rear group G12 consists of, in order from the object side along the optical axis, a positive meniscus lens L108 having a convex surface facing the object, a negative meniscus lens L109 having a concave surface facing the object side, an aperture stop S and a double convex positive lens L110.

The second lens group G2 consists of, in order from the object side along the optical axis, a cemented negative lens constructed by a double convex positive lens L201 cemented with a double concave negative lens L202.

The third lens group G3 consists of, in order from the object side along the optical axis, a cemented positive lens constructed by a negative meniscus lens L301 having a convex surface facing the object side cemented with a double convex positive lens L302.

The fourth lens group G4 consists of, in order from the object side along the optical axis, a cemented negative lens constructed by a positive meniscus lens L401 having a concave surface facing the object side cemented with a negative meniscus lens L402 having a concave surface facing the object side.

With the above-mentioned configuration, in the variable magnification optical system according to the present Example, upon varying magnification from the wide-angle end state to the telephoto end state, the second lens group G2 is moved toward the image side along the optical axis, and the third lens group G3 and the fourth lens group G4 are moved toward the object side along the optical axis such that an air interval between the first lens group G1 and the second lens group G2 is increased, an air interval between the second lens group G2 and the third lens group G3 is decreased, and an air interval between the third lens group G3 and the fourth lens group G4 is decreased.

At this time, the first lens group G1 is fixed in a position in the direction of the optical axis.

In the variable magnification optical system according to the present Example, focusing from an infinitely distance object to a close distance object is carried out by moving the focusing lens group GF in the first lens group G1 toward the image side along the optical axis.

Further, in the variable magnification optical system according to the present Example, vibration reduction is conducted by moving the vibration reducing lens GVR in the front group G11 to have a component in a direction perpendicular to the optical axis.

Here, in an entire lens system having a focal length f, a vibration reduction coefficient K, in order to correct rotational camera shake of an angle $\theta$, the vibration reducing lens group for correcting the camera shake may be moved by the amount of $(f\cdot\tan\theta)/K$ perpendicularly to the optical axis. Accordingly, in the wide-angle end state of the variable magnification optical system according to the present Example, the vibration reduction coefficient K is 0.90, and the focal length is 90.0 (mm) (See Table 2 below), so that the moving amount of the vibration reducing lens group GVR for correcting a rotational camera shake of 0.30 degrees is 0.52 (mm). In the telephoto end state, the vibration reduction coefficient K is 1.34, and the focal length is 133.4 (mm) (See Table 2 below), so that the moving amount of the vibration reducing lens group GVR for correcting a rotational camera shake of 0.20 degrees is 0.35 (mm).

In Table 2 below, various values of the variable magnification optical system according to the present Example, are listed.

TABLE 2

Second Example

[Surface Data]

| m | r | d | nd | vd |
|---|---|---|---|---|
| OP | ∞ | | | |
| 1) | 861.6548 | 1.000 | 1.74320 | 49.26 |
| 2) | 38.3290 | 4.495 | 1.85026 | 32.35 |
| 3) | 79.8038 | 5.259 | | |
| 4) | −85.9598 | 1.000 | 1.80400 | 46.60 |
| 5) | 92.0907 | 3.584 | 1.84666 | 23.78 |
| 6) | 997.0892 | Variable | | |
| 7) | 260.1997 | 4.761 | 1.61800 | 63.34 |
| 8) | −74.4390 | 0.200 | | |
| 9) | 41.1332 | 4.342 | 1.60300 | 65.44 |
| 10) | 103.6938 | 10.314 | | |
| 11) | 43.4849 | 1.000 | 1.80518 | 25.45 |
| 12) | 29.2713 | Variable | | |
| 13) | 42.0537 | 3.759 | 1.64000 | 60.20 |
| 14) | 228.3902 | 2.661 | | |
| 15) | −41.3555 | 1.000 | 1.67270 | 32.19 |
| 16) | −208.5812 | 5.201 | | |
| 17) (S) | ∞ | 1.872 | | |
| 18) | 498.5465 | 4.218 | 1.59319 | 67.90 |
| 19) | −47.0125 | Variable | | |
| 20) | 66.0924 | 4.861 | 1.78472 | 25.64 |
| 21) | −37.4130 | 1.000 | 1.85026 | 32.35 |
| 22) | 38.1753 | Variable | | |
| 23) | 75.5943 | 1.000 | 1.84666 | 23.78 |
| 24) | 32.3808 | 8.000 | 1.80400 | 46.60 |
| 25) | −87.5713 | Variable | | |
| 26) | −40.5857 | 5.768 | 1.84666 | 23.78 |
| 27) | −22.3442 | 1.000 | 1.80400 | 46.60 |
| 28) | −327.4524 | BF | | |
| I | ∞ | | | |

[Various Data]
Variabl magnification Ratio 1.48

| | W | T |
|---|---|---|
| f | 90.00 | 133.41 |
| FNO | 4.57 | 5.84 |
| 2ω | 27.32 | 18.14 |
| Ymax | 21.60 | 21.60 |
| TL | 213.84 | 213.84 |
| BF | 38.52 | 69.27 |

| | W INF | T INF | W INT | T INT | W CLO | T CLO |
|---|---|---|---|---|---|---|
| β | 0 | 0 | −0.337 | −0.500 | −0.675 | −1.000 |
| d0 | ∞ | ∞ | 211.657 | 211.657 | 77.859 | 77.859 |
| d6 | 1.643 | 1.643 | 14.823 | 14.823 | 27.054 | 27.054 |
| d12 | 27.422 | 27.422 | 14.243 | 14.243 | 2.011 | 2.011 |
| d19 | 2.099 | 31.504 | 2.099 | 31.504 | 2.099 | 31.504 |
| d22 | 42.715 | 3.781 | 42.715 | 3.781 | 42.715 | 3.781 |
| d25 | 25.146 | 3.922 | 25.146 | 3.922 | 25.146 | 3.922 |

TABLE 2-continued

Second Example

[Lens Group Data]

| Group | ST | f |
|---|---|---|
| 1 | 1 | 84.467 |
| 2 | 20 | −88.874 |
| 3 | 23 | 53.725 |
| 4 | 26 | −61.780 |

[Values for Conditional Expressions]

(1-1) $f1/fF = 1.167$
(1-2) $|f1/fVR| = 0.824$
(1-3) $(-f2)/f3 = 1.654$
(2-1) $f1/(-f2) = 0.950$
(2-2) $(-f2)/f3 = 1.654$
(2-3) $|f1/fVR| = 0.824$
(2-4) $f1/fF = 1.167$
(3-1) $f1/(-f11) = 1.430$
(3-2) $f1/fF = 1.167$
(3-3) $(-f2)/f3 = 1.654$

Figure 7A:
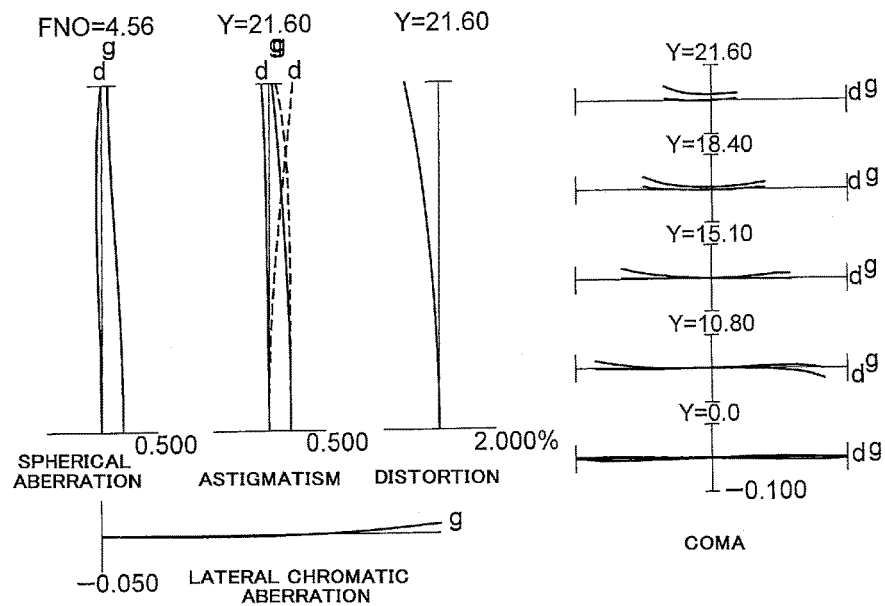
Figure 7B:
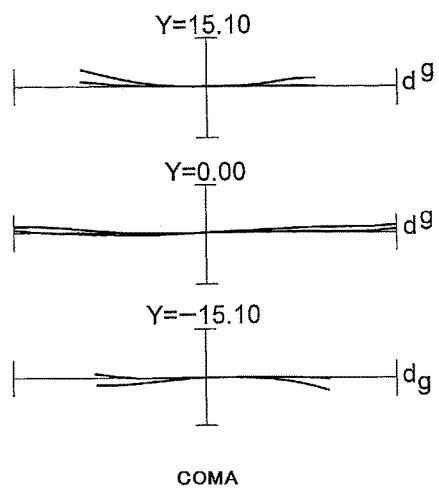

FIGS. 7A and 7B are graphs showing various aberrations of the variable magnification optical system according to the Second Example upon focusing on an infinite distance object in a wide angle end state, and meridional transverse aberration upon correcting image blur for a rotational camera shake of 0.30 degrees, respectively.

Figure 8A:
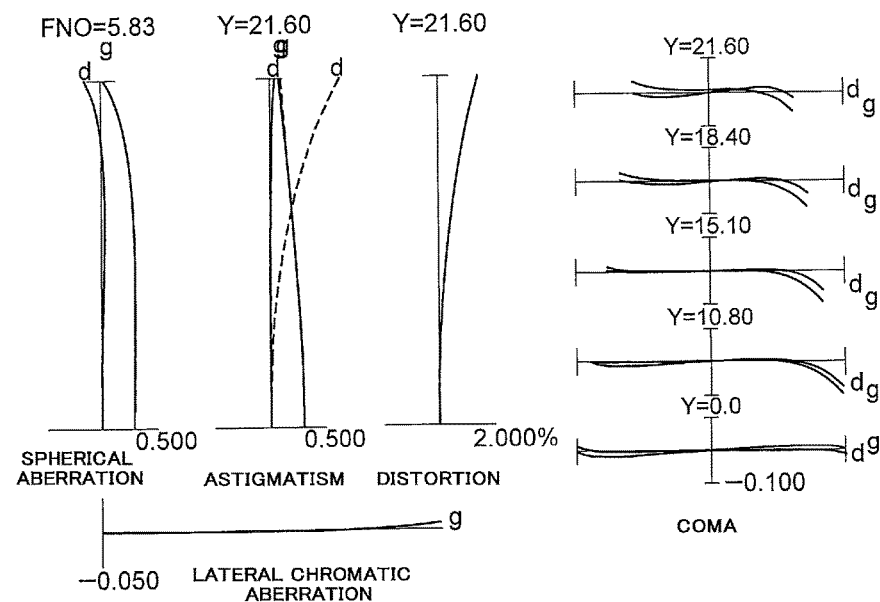
Figure 8B:
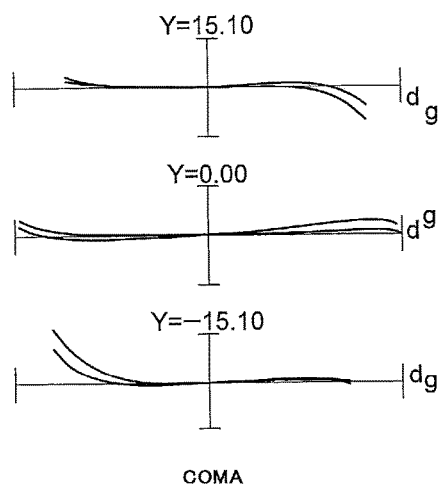

FIGS. 8A and 8B are graphs showing various aberrations of the variable magnification optical system according to the Second Example upon focusing on the infinite distance object in the telephoto end state, and meridional transverse aberration upon correcting image blur for a rotational camera shake of 0.20 degrees, respectively.

Figure 9A:
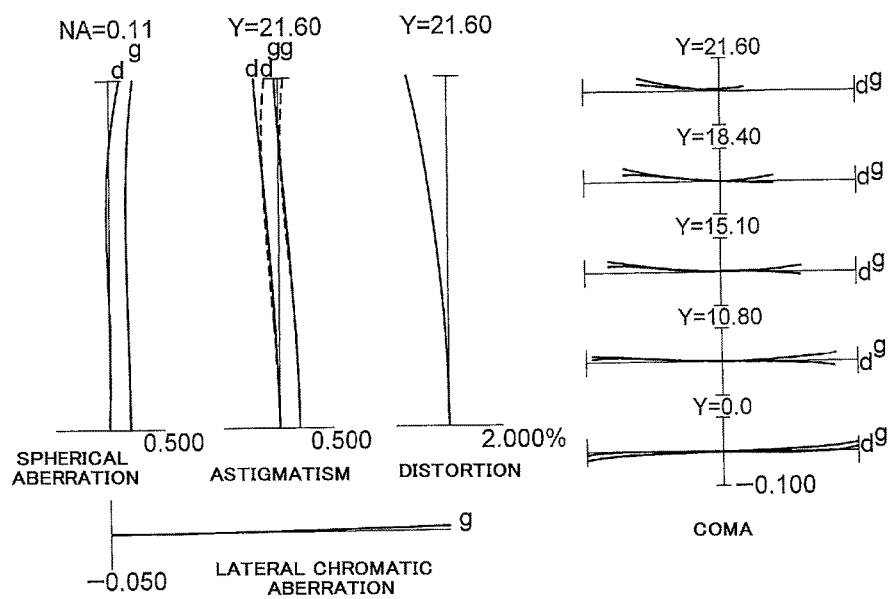
FIGS. 9A and 9B are graphs showing various aberrations of the variable magnification optical system according to the Second Example upon focusing on an intermediate distance object in the wide angle end state and in the telephoto end state, respectively.
Figure 9B:
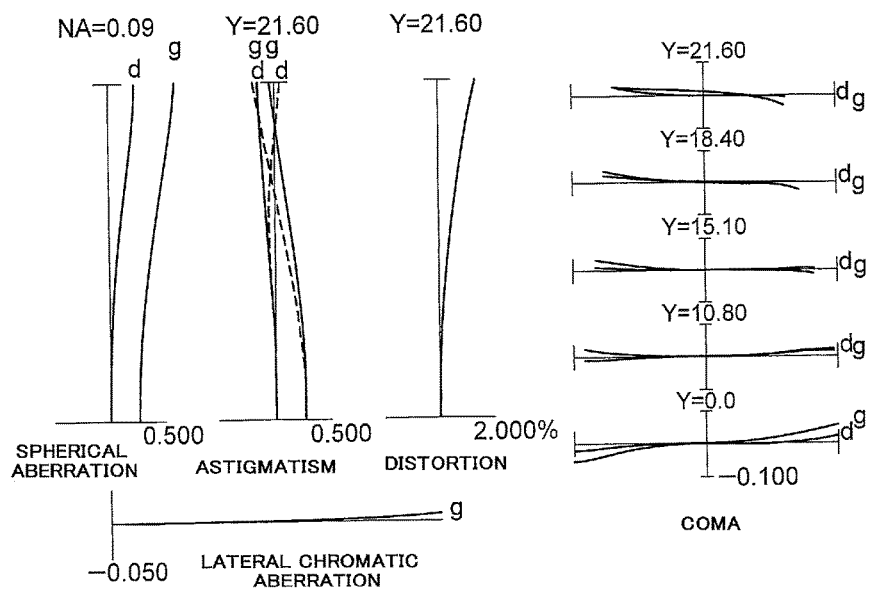

FIGS. 9A and 9B are graphs showing various aberrations of the variable magnification optical system according to the Second Example upon focusing on an intermediate distance object in which FIG. 9A shows various aberrations in a wide angle end state, and FIG. 9B shows various aberrations in a telephoto end state.

Figure 10A:
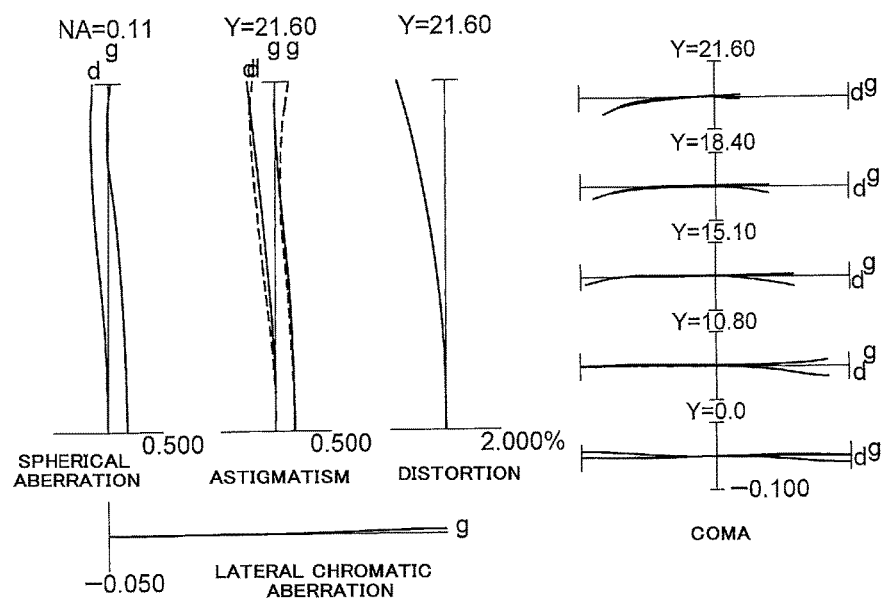
FIGS. 10A and 10B are graphs showing various aberrations of the variable magnification optical system according to the Second Example upon focusing on a close distance object in the wide angle end state and in the telephoto end state, respectively.
Figure 10B:
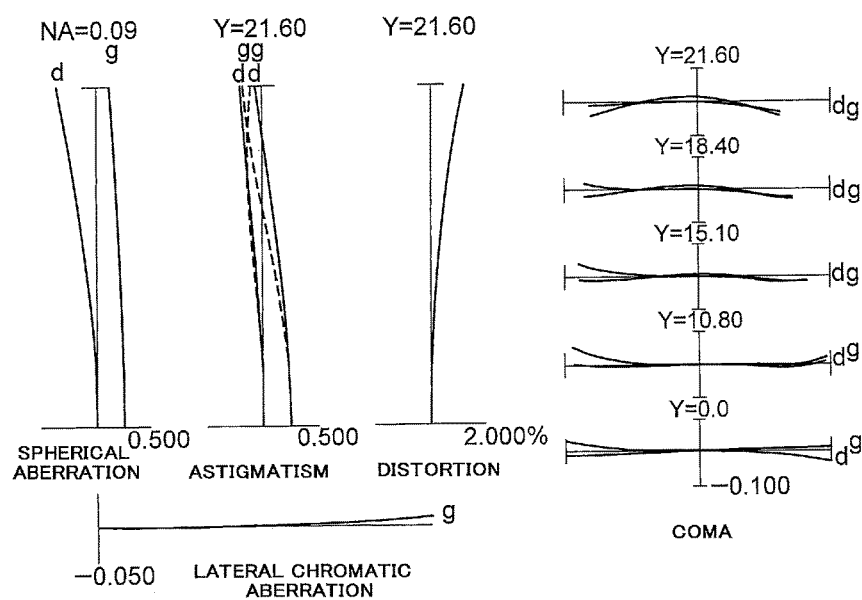

FIGS. 10A and 10B are graphs showing various aberrations of the variable magnification optical system according to the Second Example upon focusing on a close distance object in which FIG. 10A shows various aberrations in a wide angle end state, and FIG. 10B shows various aberrations in a telephoto end state.

As is apparent from the respective graphs, the variable magnification optical system according to the Second Example shows superb optical performance upon focusing on from an infinite distance object to a close distance object, and further superb optical performance even upon correcting displacement of an imaging position caused by a camera shake or the like.

According to the Examples as above-mentioned, it is possible to realize a variable magnification optical system having a superb optical performance from upon focusing on an infinite distance object to upon focusing on a close distance object, and further a superb optical performance upon correcting displacement of an imaging position caused by a camera shake or the like. Note that each of the above described Examples is a concrete example of the invention of the present application, and the invention of the present application is not limited to them. The contents described below can be adopted without deteriorating an optical performance of the variable magnification optical systems of the invention of the present application.

Meanwhile, in the variable magnification optical systems according to the first to the third embodiments of the present application, a 35 mm equivalent focal length is on the order of 60-80 mm, in a wide angle end state and 150-200 mm in a telephoto end state. Further, in the variable magnification optical systems according to the first to the third embodiments of the present application, the variable magnification ratio is on the order of 1.5 to 4. Furthermore, in the variable magnification optical systems according to the first to the third embodiments of the present application, a maximum shooting magnification ß in any focal length state is equal to or exceeds −0.5 and equal to or falls below −1.0, and a close distance shooting and varying magnification are compatible.

Although the variable magnification optical systems each having four group configuration were illustrated above as numerical examples of the variable magnification optical systems according to the first to the third embodiments of the present application, the present application is not limited to them and the variable magnification optical systems having other configurations (such as five group configuration, six group configuration, seven group configuration and the like) can be configured. Concretely, a lens configuration that a lens or a lens group is added to the most object side of the variable magnification optical system according to the first to the third embodiments of the present application is possible, and a lens configuration that a lens or a lens group is added to the most image side of the variable magnification optical system according to the first to the third embodiments of the present application is also possible. Alternatively, a lens or a lens group may be added between the second lens group G2 and the third lens group G3 to make a configuration having five or more lens groups. Alternatively, a lens or a lens group may be added between the third lens group G3 and the fourth lens group G4 to make a configuration having five or more lens groups. Alternatively, the third lens group G3 and the fourth lens group G4 may be made to move together upon varying magnification, thereby forming a three group configuration.

In each Example described above, the first lens group G1 is fixed upon varying magnification, but instead thereof the first lens group G1 may be moved in the direction of the optical axis upon varying magnification.

Further, in each Example described above, the first lens group G1 comprises a fixed partial lens group that is fixed upon focusing and upon correcting a camera shake, a focusing lens group that moves in the direction of the optical axis upon focusing and a vibration reducing lens group that moves to have a component in a direction substantially perpendicular to the optical axis upon correcting a camera shake. It is preferable that the first lens group G1 comprises a fixed partial lens group having negative refractive power at the most object side. Although the first lens group G1 comprises two fixed partial lens groups in the each Example as described above, there is not limited to such a configuration. Furthermore, it is preferable that the vibration reduction lens group is arranged at the image side of the focusing lens group.

Further, in the variable magnification optical systems according to the first embodiment to the third embodiment of the present application, a portion of a lens group, a single lens group in the entirety thereof, or a plurality of lens groups can be moved in the direction of the optical axis as a focusing lens group. It is particularly preferable that at least a portion of the first lens group is moved as the focusing lens group. The focusing lens group can be used for auto focus, and suitable for being driven by a motor for auto focus such as an ultrasonic motor.

Further, in the variable magnification optical systems according to the first embodiment to the third embodiment of the present application, any lens group in the entirety thereof or a portion thereof can be so moved, as a vibration reducing lens group, to have a component in a direction perpendicular to the optical axis, or rotationally moved (swayed) in an in-plane direction including the optical axis for correcting an image blur caused by a camera shake or the like. Particularly, it is preferable that at least a portion of the first lens group is used as a vibration reducing lens group.

Further, in the variable magnification optical systems according to the first embodiment to the third embodiment of the present application, a lens surface of a lens may be a spherical surface, a plane surface, or an aspherical surface. When a lens surface is a spherical surface or a plane surface, lens processing, assembling and adjustment become easy, and it is possible to prevent deterioration in optical performance caused by errors in lens processing, assembling and adjustment, so that it is preferable. Moreover, even if an image plane is shifted, deterioration in representation performance is little, so that it is preferable. When a lens surface is an aspherical surface, the aspherical surface may be fabricated by a grinding process, a glass molding process that a glass material is formed into an aspherical shape by a mold, or a compound type process that a resin material on a glass lens surface is formed into an aspherical shape. A lens surface may be a diffractive optical surface, and a lens may be a graded-index type lens (GRIN lens) or a plastic lens.

Further, in the variable magnification optical systems according to the first embodiment to the third embodiment of the present application, it is preferable that an aperture stop is disposed in the first lens group, and the function may be substituted by a lens frame without disposing a member as an aperture stop.

Moreover, the lens surface(s) of the lenses configuring the variable magnification optical systems according to the first embodiment to the third embodiment of the present application may be coated with anti-reflection coating(s) having a high transmittance in a broad wavelength range. With this contrivance, it is feasible to reduce a flare as well as ghost and attain a high optical performance with high contrast.

Next, a camera equipped with the variable magnification optical system according to the first to the third embodiments of the present application, will be explained with referring to FIG. 11.

Figure 11:
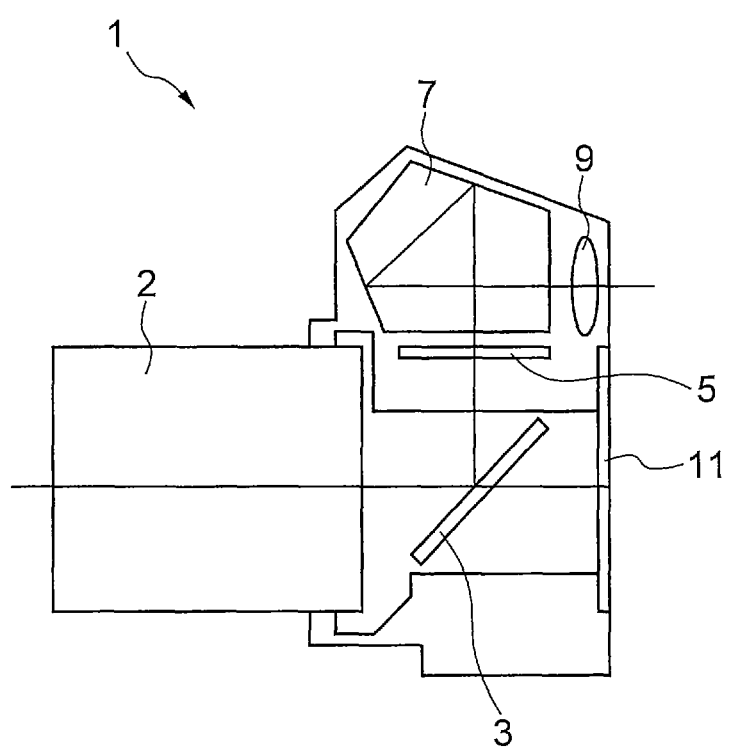
FIG. 11 is a diagram showing a construction of a camera equipped with the variable magnification optical system according to the first to the third embodiments of the present application

FIG. 11 is a view showing a configuration of a lens interchangeable type single lens reflex digital camera equipped with the variable magnification optical system according to the first to the third embodiments of the present application.

A camera 1 is a lens interchangeable type single lens reflex digital camera equipped with the variable magnification optical system according to the first Example as an imaging lens 2, as shown in FIG. 11.

In the single lens reflex digital camera 1 shown in FIG. 11, light emitted from an unillustrated object (an object to be imaged) is converged by the imaging lens 2, and forms an image of the object to be imaged on a focusing plate 5 through a quick-return mirror 3. The image of the object to be imaged formed on the focusing plate 5 is reflected a plurality of times in a pentagonal prism 7 and led to an eyepiece lens 9. Thus, a photographer can observe the object image through eyepiece lens 9 as an elected image.

When the photographer presses an unillustrated release button, the quick return mirror 3 is withdrawn out of the optical path, and the light from the object converged by the imaging lens 2 is imaged on an imaging device 11 and stored in an unillustrated memory as an object image. Thus, the photographer can take a picture of the object to be imaged by the camera 1.

The variable magnification optical system according to the First Example mounted on the camera 1 as the imaging lens 2 has a high optical performance upon focusing on from an infinite distance object to a close distance object, and further a high optical performance upon correcting displacement of an imaging position caused by a camera shake or the like. Accordingly, the camera 1 can realize a high optical performance upon focusing on from an infinite distance object to a close distance object, and a high optical performance upon correcting displacement of an imaging position caused by a camera shake or the like. Incidentally, even if the camera is so composed that the variable magnification optical system according to the second Example is mounted on the camera as the imaging lens 2, the same effect can be attained as the camera 1. Moreover, the camera 1 may be a type in which the imaging lens 2 is detachably held, or the imaging lens 2 is integrally formed with the camera 1. The camera 1 can be a type which has no quick return mirror.

Next, an outline of a method for manufacturing a variable magnification optical system according to the first embodiment to the third embodiments of the present application is described.

Figure 12:
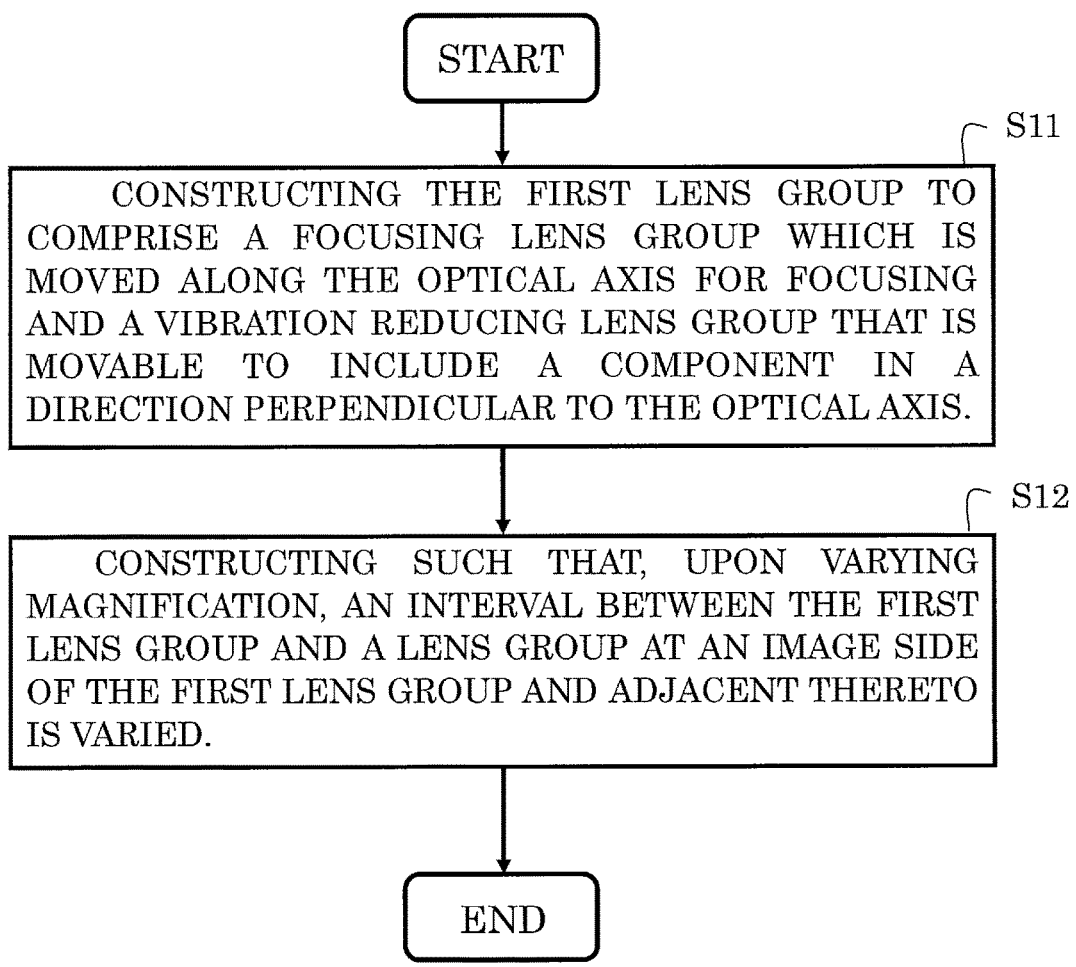
FIG. 12 is a flowchart schematically showing a method for manufacturing the variable magnification optical system according to the first embodiment of the present application.

FIG. 12 is a view showing an outline of a method for manufacturing a variable magnification optical system according to the first embodiment of the present application.

The method for manufacturing the variable magnification optical system according to the first embodiment of the present application is a method for manufacturing a variable magnification optical system which comprises, in order from an object side, a first lens group having positive refractive power and at least one lens group. The method comprises the following steps of S11 and S12.

Step S11: Constructing the first lens group to comprise a focusing lens group which is moved along the optical axis for focusing and a vibration reducing lens group that is movable to include a component in a direction perpendicular to the optical axis.

Step S12: Constructing such that, upon varying magnification, an interval between the first lens group and a lens group at an image side of the first lens group and adjacent thereto is varied.

According to the method for manufacturing the variable magnification optical system according to the first embodiment of the present application, it is possible to manufacture a variable magnification optical system having a high optical performance from upon focusing on an infinite distance object to upon focusing on a close distance object and a high optical performance upon correcting displacement of an imaging position caused by a camera shake or the like.

Next, a method for manufacturing a variable magnification optical system according to the second embodiment of the present application is described.

Figure 13:
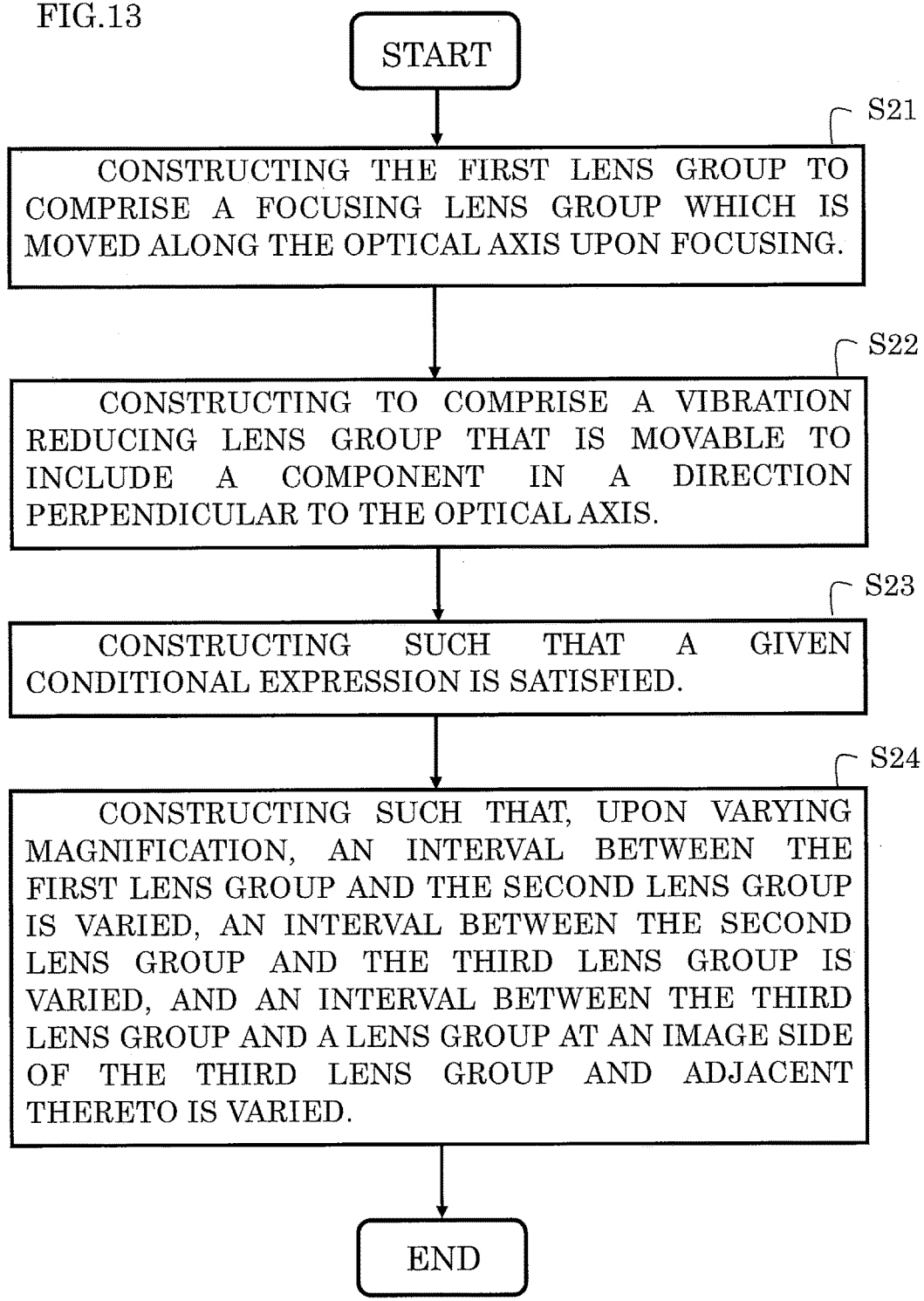
FIG. 13 is a flowchart schematically showing a method for manufacturing the variable magnification optical system according to the second embodiment of the present application.

FIG. 13 is a view showing an outline of a method for manufacturing a variable magnification optical system according to the second embodiment of the present application.

The method for manufacturing the variable magnification optical system according to the second embodiment of the present application is a method for manufacturing a variable magnification optical system which comprises, in order from an object side, a first lens group having positive refractive power, a second lens group having negative refractive power, a third lens group having positive refractive power and at least one lens group. The method comprises the following steps of S21 and S24.

Step S21: constructing the first lens group to comprise a focusing lens group which is moved along the optical axis upon focusing.

Step S22: Constructing to comprise a vibration reducing lens group that is movable to include a component in a direction perpendicular to the optical axis.

Step S23; Constructing such that the following conditional expression (2-1) is satisfied:

$$0.2 < f1/(-f2) < 2.00 \quad (2\text{-}1)$$

where f1 denotes a focal length of the first lens group, and f2 denotes a focal length of the second lens group.

Step S24: Constructing such that, upon varying magnification, an interval between the first lens group and the second lens group is varied, an interval between the second lens group and the third lens group is varied, and an interval between the third lens group and a lens group at an image side of the third lens group and adjacent thereto is varied.

According to the method for manufacturing the variable magnification optical system according to the second embodiment of the present application, it is possible to manufacture a variable magnification optical system having a high optical performance from upon focusing on an infinite distance object to upon focusing on a close distance object and a high optical performance upon correcting displacement of an imaging position caused by a camera shake or the like.

Next, a method for manufacturing a variable magnification optical system according to the third embodiment of the present application is described.

Figure 14:
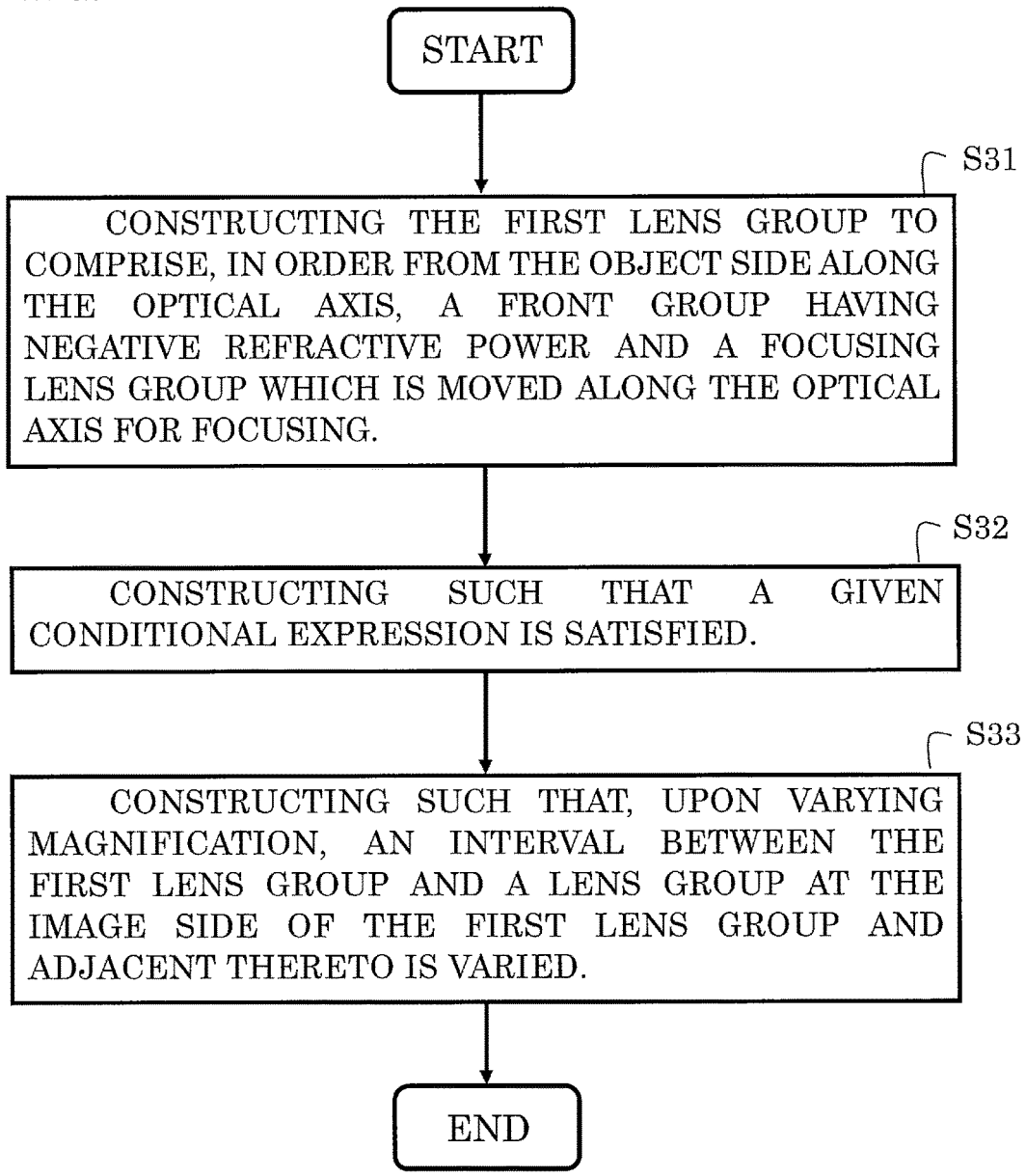
FIG. 14 is a flowchart schematically showing a method for manufacturing the variable magnification optical system according to the third embodiment of the present application.

FIG. 14 is a view showing an outline of a method for manufacturing a variable magnification optical system according to the third embodiment of the present application.

The method for manufacturing the variable magnification optical system according to the third embodiment of the present application is a method for manufacturing a variable magnification optical system which comprises, in order from an object side along the optical axis, a first lens group having positive refractive power and at least one lens group. The method comprises the following steps of S31 to S33.

Step S31: Constructing the first lens group to comprise, in order from the object side along the optical axis, a front group having negative refractive power and a focusing lens group which is moved along the optical axis for focusing.

Step S32: Constructing such that the following conditional expression (3-1) is satisfied:

$$1.0 < f1/(-f11) < 2.5 \quad (3\text{-}1)$$

where f1 denotes a focal length of the first lens group, and f11 denotes a focal length of the front group.

Step S33: Constructing such that, upon varying magnification, an interval between the first lens group and a lens group at the image side of the first lens group and adjacent thereto is varied.

According to the method for manufacturing the variable magnification optical system according to the third embodiment of the present application, it is possible to manufacture a variable magnification optical system having a high optical performance from upon focusing on an infinite distance object to upon focusing on a close distance object.

What is claimed is:

1. A variable magnification optical system comprising, in order from an object side, a first lens group having positive refractive power, and at least one lens group;

upon varying magnification, an interval between the first lens group and a lens group at an image side of the first lens group and adjacent thereto being varied;

the first lens group comprising a focusing lens group which is moved along the optical axis for focusing; and the following conditional expression being satisfied:

$$0.6 < f1/fF < 3.5$$

where f1 denotes a focal length of the first lens group, and fF denotes a focal length of the focusing lens group.

2. A variable magnification optical system comprising, in order from an object side, a first lens group having positive refractive power, a second lens group having negative refractive power, a third lens group having positive refractive power and a fourth lens group having negative refractive power;

upon varying magnification, an interval between the first lens group and the second lens group being varied, an interval between the second lens group and the third lens group being varied and an interval between the third lens group and the fourth lens group being varied, the first lens group comprising a focusing lens group which is moved along the optical axis for focusing; and the following conditional expression being satisfied:

$$0.2 < f1/(-f2) < 2.00$$

where f1 denotes a focal length of the first lens group, and f2 denotes a focal length of the second lens group.

3. A variable magnification optical system comprising, in order from an object side along the optical axis, a first lens group having positive refractive power, and at least one lens group;

upon varying magnification, an interval between the first lens group and a lens group at an image side of the first lens group and adjacent thereto being varied;

the first lens group comprising, in order from the object side along the optical axis, a front group having negative refractive power and a focusing lens group which is moved along the optical axis for focusing; and the following conditional expression being satisfied:

$$1.2 < f1/(-f11) < 2.5$$

where f1 denotes a focal length of the first lens group, and f11 denotes a focal length of the front group.

4. A variable magnification optical system according to claim 1, wherein the first lens group comprises a vibration reducing lens group that is movable to include a component in a direction perpendicular to the optical axis.

5. A variable magnification optical system according to claim 4, wherein the first lens group comprises the vibration reducing lens at the image side of the focusing lens.

6. A variable magnification optical system according to claim 1, wherein the position of the first lens group with respect to the imaging plane is fixed, upon varying magnification.

7. A variable magnification optical system according to claim 1, comprising a vibration reducing lens group that is movable to include a component in a direction perpendicular to the optical axis; and the following conditional expression being satisfied:

$$0.2 < |f1/fVR| < 2.0$$

where f1 denotes the focal length of the first lens group, and fVR denotes a focal length of the vibration reducing lens group.

8. A variable magnification optical system according to claim 1, wherein the focusing lens group has at least two lens components each having positive refractive power.

9. A variable magnification optical system according to claim 1, wherein the first lens group comprises further a lens group at an image side of the focusing lens group.

10. A variable magnification optical system according to claim 1, comprising, in order from the object side along the optical axis, the first lens group, a second lens group having negative refractive power, a third lens group having positive refractive power and a fourth lens group having negative refractive power.

11. A variable magnification optical system according to claim 1, comprising, in order from the object side along the optical axis, the first lens group, a second lens group, a third lens group and a fourth lens group;

upon varying magnification from a wide angle end state to a telephoto end state, the second lens group being moved toward the image side and the fourth lens group being moved toward the object side.

12. A variable magnification optical system according to claim 1, comprising, in order from the object side along the optical axis, the first lens group, a second lens group having negative refractive power, and a third lens group having positive refractive power; and the following conditional expression being satisfied:

$$1.2 < (-f2)/f3 < 2.5$$

where f2 denotes a focal length of the second lens group, and f3 denotes a focal length of the third lens group.

13. An optical apparatus comprising a variable magnification optical system according to claim 1.

14. A variable magnification optical system according to claim 1, wherein a shooting magnification in any focal length state is equal to or exceeds −0.5.

15. A variable magnification optical system according to claim 2, wherein the first lens group comprises a vibration reducing lens group that is movable to include a component in a direction perpendicular to the optical axis.

16. A variable magnification optical system according to claim 15, wherein the first lens group comprises the vibration reducing lens at the image side of the focusing lens.

17. A variable magnification optical system according to claim 2, wherein the position of the first lens group with respect to the imaging plane is fixed, upon varying magnification.

18. A variable magnification optical system according to claim 2, comprising a vibration reducing lens group that is movable to include a component in a direction perpendicular to the optical axis; and the following conditional expression being satisfied:

$$0.2 < |f1/fVR| < 2.0$$

where f1 denotes the focal length of the first lens group, and fVR denotes a focal length of the vibration reducing lens group.

19. A variable magnification optical system according to claim 2, wherein the following conditional expression is satisfied:

$$0.2 < f1/fF < 3.5$$

where f1 denotes the focal length of the first lens group, and fF denotes a focal length of the focusing lens group.

20. A variable magnification optical system according to claim 2, wherein the focusing lens group has at least two lens components each having positive refractive power.

21. A variable magnification optical system according to claim 2, wherein the first lens group comprises further a lens group at an image side of the focusing lens group.

22. A variable magnification optical system according to claim 2,
wherein upon varying magnification from a wide angle end state to a telephoto end state, the second lens group being moved toward the image side and the fourth lens group being moved toward the object side.

23. A variable magnification optical system according to claim 2,
wherein the following conditional expression is satisfied:

$$1.2 < (-f2)/f3 < 2.5$$

where f2 denotes a focal length of the second lens group, and f3 denotes a focal length of the third lens group.

24. An optical apparatus comprising a variable magnification optical system according to claim 2.

25. A variable magnification optical system according to claim 2, wherein a shooting magnification in any focal length state is equal to or exceeds −0.5.

26. A variable magnification optical system according to claim 3, wherein the first lens group comprises a vibration reducing lens group that is movable to include a component in a direction perpendicular to the optical axis.

27. A variable magnification optical system according to claim 26, wherein the first lens group comprises the vibration reducing lens at the image side of the focusing lens.

28. A variable magnification optical system according to claim 3, wherein the position of the first lens group with respect to the imaging plane is fixed, upon varying magnification.

29. A variable magnification optical system according to claim 3, wherein the following conditional expression is satisfied:

$$0.2 < f1/fF < 3.5$$

where f1 denotes the focal length of the first lens group, and fF denotes a focal length of the focusing lens group.

30. A variable magnification optical system according to claim 3, wherein the focusing lens group has at least two lens components each having positive refractive power.

31. A variable magnification optical system according to claim 3, wherein the first lens group comprises further a lens group at an image side of the focusing lens group.

32. A variable magnification optical system according to claim 3, comprising, in order from the object side along the optical axis, the first lens group, a second lens group having negative refractive power, a third lens group having positive refractive power and a fourth lens group having negative refractive power.

33. A variable magnification optical system according to claim 3, comprising, in order from the object side along the optical axis, the first lens group, a second lens group, a third lens group and a fourth lens group;
upon varying magnification from a wide angle end state to a telephoto end state, the second lens group being moved toward the image side and the fourth lens group being moved toward the object side.

34. A variable magnification optical system according to claim 3, comprising, in order from the object side along the optical axis, the first lens group, a second lens group having negative refractive power, and a third lens group having positive refractive power; and
the following conditional expression being satisfied:

$$1.2 < (-f2)/f3 < 2.5$$

where f2 denotes a focal length of the second lens group, and f3 denotes a focal length of the third lens group.

35. An optical apparatus comprising a variable magnification optical system according to claim 3.

36. A variable magnification optical system according to claim 3, wherein a shooting magnification in any focal length state is equal to or exceeds −0.5.

37. A method for manufacturing a variable magnification optical system comprising, in order from an object side along the optical axis, a first lens group having positive refractive power, and at least one lens group,
the method comprising the steps of:
constructing the first lens group to comprise a focusing lens group which is moved along the optical axis for focusing;
constructing such that, upon varying magnification, an interval between the first lens group and a lens group at an image side of the first lens group and adjacent thereto is varied; and
constructing such that a shooting magnification in any focal length state is equal to or exceeds −0.5.

38. A variable magnification optical system comprising, in order from an object side along the optical axis, a first lens group having positive refractive power, a second lens group, a third lens group and a fourth lens group;
upon varying magnification, an interval between the first lens group and the second lens group being varied, an interval between the second lens group and the third lens group being varied and an interval between the third lens group and the fourth lens group being varied;
the first lens group comprising a focusing lens group which is moved along the optical axis for focusing; and
upon varying magnification from a wide angle end state to a telephoto end state, the second lens group being moved toward the image side and the fourth lens group being moved toward the object side.

39. A variable magnification optical system according to claim 38, wherein the first lens group comprises a vibration reducing lens group that is movable to include a component in a direction perpendicular to the optical axis.

40. A variable magnification optical system according to claim 39, wherein the first lens group comprises the vibration reducing lens at the image side of the focusing lens.

41. A variable magnification optical system according to claim 38, wherein the position of the first lens group with respect to the imaging plane is fixed, upon varying magnification.

42. A variable magnification optical system according to claim 38, comprising a vibration reducing lens group that is movable to include a component in a direction perpendicular to the optical axis; and
the following conditional expression being satisfied:

$$0.2 < |f1/fVR| < 2.0$$

where f1 denotes the focal length of the first lens group, and fVR denotes a focal length of the vibration reducing lens group.

43. A variable magnification optical system according to claim 38, wherein the following conditional expression is satisfied:

$$0.2 < f1/fF < 3.5$$

where f1 denotes the focal length of the first lens group, and fF denotes a focal length of the focusing lens group.

44. A variable magnification optical system according to claim 38, wherein the focusing lens group has at least two lens components each having positive refractive power.

45. A variable magnification optical system according to claim 38, wherein the first lens group comprises further a lens group at an image side of the focusing lens group.

46. A variable magnification optical system according to claim 38, wherein the second lens group has negative refractive power, the third lens group has positive refractive power, and the fourth lens group has negative refractive power.

47. A variable magnification optical system according to claim 38, wherein the second lens group has negative refractive power, and the third lens group has positive refractive power; and the following conditional expression is satisfied:

$$1.2 < (-f2)/f3 < 2.5$$

where f2 denotes a focal length of the second lens group, and f3 denotes a focal length of the third lens group.

48. An optical apparatus comprising a variable magnification optical system according to claim 38.

49. A variable magnification optical system according to claim 38, wherein a shooting magnification in any focal length state is equal to or exceeds −0.5.

50. A method for manufacturing a variable magnification optical system comprising, in order from an object side along the optical axis, a first lens group having positive refractive power, and at least one lens group;

the method comprising steps of:
constructing such that, upon varying magnification, an interval between the first lens group and a lens group at the image side of the first lens group and adjacent thereto is varied;
constructing the first lens group to comprise a focusing lens group which is moved along the optical axis for focusing; and
constructing such that the following conditional expression is satisfied:

$$0.6 < f1/fF < 3.5$$

where f1 denotes the focal length of the first lens group, and fF denotes a focal length of the focusing lens group.

51. A method for manufacturing a variable magnification optical system comprising, in order from an object side, a first lens group having positive refractive power, a second lens group having negative refractive power, a third lens group having positive refractive power and a fourth lens group having negative refractive power;

the method comprising steps of:
constructing such that, upon varying magnification, an interval between the first lens group and the second lens group is varied, an interval between the second lens group and the third lens group is varied, and an interval between the third lens group and the fourth lens group is varied;
constructing the first lens group to comprise a focusing lens group which is moved along the optical axis for focusing; and
constructing such that the following conditional expression is satisfied:

$$0.2 < f1/(-f2) < 2.00$$

where f1 denotes a focal length of the first lens group, and f2 denotes a focal length of the second lens group.

52. A method for manufacturing a variable magnification optical system comprising, in order from an object side along the optical axis, a first lens group having positive refractive power, and at least one lens group;

the method comprising steps of:
constructing such that, upon varying magnification, an interval between the first lens group and a lens group at the image side of the first lens group and adjacent thereto is varied;
constructing the first lens group to comprise, in order from the object side along the optical axis, a front group having negative refractive power and a focusing lens group which is moved along the optical axis for focusing; and
constructing such that the following conditional expression is satisfied:

$$1.2 < f1/(-f11) < 2.5$$

where f1 denotes a focal length of the first lens group, and f11 denotes a focal length of the front group.

53. A method for manufacturing a variable magnification optical system comprising, in order from an object side along the optical axis, a first lens group having positive refractive power, a second lens group, a third lens group and a fourth lens group;

the method comprising steps of:
constructing such that, upon varying magnification, an interval between the first lens group and the second lens group is varied, an interval between the second lens group and the third lens group is varied and an interval between the third lens group and the fourth lens group is varied;
constructing the first lens group to comprise a focusing lens group which is moved along the optical axis for focusing; and
constructing such that, upon varying magnification from a wide angle end state to a telephoto end state, the second lens group is moved toward the image side and the fourth lens group is moved toward the object side.

* * * * *